US011417122B2

(12) United States Patent
Park

(10) Patent No.: US 11,417,122 B2
(45) Date of Patent: Aug. 16, 2022

(54) METHOD FOR MONITORING AN OCCUPANT AND A DEVICE THEREFOR

(71) Applicant: LG ELECTRONICS INC., Seoul (KR)

(72) Inventor: Minsick Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 337 days.

(21) Appl. No.: 16/487,822

(22) PCT Filed: Nov. 21, 2018

(86) PCT No.: PCT/KR2018/014358
§ 371 (c)(1),
(2) Date: Aug. 21, 2019

(87) PCT Pub. No.: WO2020/105751
PCT Pub. Date: May 28, 2020

(65) Prior Publication Data
US 2021/0334564 A1 Oct. 28, 2021

(51) Int. Cl.
*G06K 9/00* (2022.01)
*G06V 20/59* (2022.01)
(Continued)

(52) U.S. Cl.
CPC ............ *G06V 20/597* (2022.01); *B60Q 9/00* (2013.01); *B60R 21/015* (2013.01);
(Continued)

(58) Field of Classification Search
CPC .......... G06K 9/00201; G06K 9/00208; G06K 9/00214; G06K 9/00221; G06K 9/00228;
(Continued)

(56) References Cited

U.S. PATENT DOCUMENTS 5,983,147 A 11/1999 Krumm
6,198,998 B1 * 3/2001 Farmer .................. G06V 20/59 382/104

(Continued)

FOREIGN PATENT DOCUMENTS

KR 1020010005883 1/2001

OTHER PUBLICATIONS

PCT International Application No. PCT/KR2018/014358, Notification of Transmittal of the International Search Report and the Written Opinion of the International Searching Authority, or Declaration dated Aug. 12, 2019, 9 pages.

*Primary Examiner* — Eric Rush
(74) *Attorney, Agent, or Firm* — Lee Hong Degerman Kang & Waimey

(57) ABSTRACT

The present invention relates to an occupant monitoring method and apparatus therefor. A monitoring apparatus according to one aspect of the present invention may include a camera obtaining an image in a vehicle and a processor processing the image. Moreover, the processor may include a detecting module separating each region in which an object exists from the image, a classifying module classifying the object existing in the each separated region and a recognizing module recognizing a pose of an occupant if the object corresponds to the occupant.

11 Claims, 19 Drawing Sheets

(51) Int. Cl.

| | |
|---|---|
| ***B60R 21/015*** | (2006.01) |
| ***G06T 7/11*** | (2017.01) |
| ***G06T 7/70*** | (2017.01) |
| ***B60Q 9/00*** | (2006.01) |
| ***G06K 9/62*** | (2022.01) |
| ***G06T 7/20*** | (2017.01) |
| ***G06V 10/70*** | (2022.01) |
| ***G06V 40/10*** | (2022.01) |
| ***G06V 40/16*** | (2022.01) |
| ***G06V 10/26*** | (2022.01) |
| *B60R 21/01* | (2006.01) |
| *B60R 21/00* | (2006.01) |

(52) U.S. Cl.

CPC .. *B60R 21/01538* (2014.10); *B60R 21/01552* (2014.10); *B60R 21/01556* (2014.10); *G06K 9/6267* (2013.01); *G06T 7/11* (2017.01); *G06T 7/20* (2013.01); *G06T 7/70* (2017.01); *G06V 10/26* (2022.01); *G06V 10/70* (2022.01); *G06V 10/768* (2022.01); *G06V 20/59* (2022.01); *G06V 20/593* (2022.01); *G06V 40/10* (2022.01); *G06V 40/103* (2022.01); *G06V 40/161* (2022.01); *B60R 2021/0032* (2013.01); *B60R 2021/01204* (2013.01); *G06T 2207/20021* (2013.01); *G06T 2207/30268* (2013.01)

(58) Field of Classification Search

CPC ........... G06K 9/00362; G06K 9/00369; G06K 9/00375; G06K 9/00382; G06K 9/00832; G06K 9/00838; G06K 9/00845; G06K 9/2054; G06K 9/34; G06K 9/6201; G06K 9/6202; G06K 9/6267; G06K 9/72; G06K 9/627; G06T 7/10; G06T 7/11; G06T 7/20; G06T 7/60; G06T 7/70; G06T 2207/20021; G06T 2207/30268; B60Q 9/00; B60R 21/015; B60R 21/01512; B60R 21/01538; B60R 21/01552; B60R 21/01556; B60R 2021/003; B60R 2021/0032; B60R 2021/0034; B60R 2021/0037; B60R 2021/01204; B60R 21/01516; B60R 21/16; B60W 40/08; B60W 2040/0881; B60W 50/14; B60W 2050/143; B60W 2050/146; G06V 10/22; G06V 10/25; G06V 10/26; G06V 10/70; G06V 10/74; G06V 10/768; G06V 10/82; G06V 20/59; G06V 20/593; G06V 20/597; G06V 40/10; G06V 40/103; G06V 40/16; G06V 40/161; B60K 28/04; B60K 35/00; B60Y 2302/03

USPC ....... 382/100, 103, 104, 115, 118, 154, 155, 382/157, 158, 173, 180, 181, 190, 209, 382/224, 229, 258, 259, 282, 286, 288, 382/291; 340/501, 540, 568.1, 573.1, 340/573.7; 348/77, 135, 148, 169, 172; 701/1, 36, 39, 40, 45; 180/271, 272

See application file for complete search history.

(56) References Cited

U.S. PATENT DOCUMENTS

| | | | | |
|---|---|---|---|---|
| 9,041,789 | B2 * | 5/2015 | Schamp | G06V 20/597 348/81 |
| 10,163,018 | B1 * | 12/2018 | Chan | G06K 9/6202 |
| 10,255,485 | B2 * | 4/2019 | Arata | G06V 40/103 |
| 10,262,226 | B1 * | 4/2019 | Flowers | G06K 9/00845 |
| 10,953,850 | B1 * | 3/2021 | Pertsel | G06K 9/00838 |
| 2002/0050924 | A1 * | 5/2002 | Mahbub | G06K 9/00369 340/426.1 |
| 2004/0220705 | A1 | 11/2004 | Basir et al. | |
| 2005/0102080 | A1 | 5/2005 | Dell' Eva et al. | |
| 2005/0111700 | A1 * | 5/2005 | O'Boyle | G06K 9/00832 382/104 |
| 2007/0055427 | A1 | 3/2007 | Sun et al. | |
| 2008/0255731 | A1 * | 10/2008 | Mita | B60R 21/01538 382/103 |
| 2017/0161576 | A1 * | 6/2017 | Banno | G06K 9/00845 |
| 2018/0065582 | A1 * | 3/2018 | Miller | G06K 9/00832 |
| 2020/0293800 | A1 * | 9/2020 | Yoshimura | G06V 20/597 |

* cited by examiner (a)

(b)

(a)

(b)

METHOD FOR MONITORING AN OCCUPANT AND A DEVICE THEREFOR

CROSS-REFERENCE TO RELATED APPLICATIONS

This application is the National Stage filing under 35 U.S.C. 371 of International Application No. PCT/KR2018/014358, filed on Nov. 21, 2018, the contents of which are all hereby incorporated by reference herein in its entirety.

TECHNICAL FIELD

The present invention relates to a method of monitoring occupants and apparatus therefor, and more particularly, to a method of detecting and classifying an occupant of a vehicle and recognizing a pose of the occupant and apparatus therefor.

BACKGROUND ART

A vehicle is a device that is moved in a direction desired by a user. A car is a representative example of the vehicle.

Meanwhile, for the convenience of a vehicle using user, various sensors and electronic devices and the like tend to be mounted in the vehicle. Particularly, ongoing efforts are actively made to study ADAS (advanced driver assistance system) for user's driving convenience. Moreover, ongoing efforts are actively made to research and develop autonomous vehicles.

Meanwhile, if autonomous driving over level 3 is commercialized, in-vehicle occupant detection and monitoring becomes more important in aspects of safety and security. However, many restrictions are put on the safety functions based on driver-oriented monitoring (e.g., driver seat monitoring) of the related art.

For example, since an occupant monitoring method according to a related art determines attributes (e.g., size, age, etc.) of an occupant using a pressure sensor, it has a problem of degraded accuracy. Accordingly, it is necessary to reinforce a vehicle safety function through an in-vehicle multi-camera based monitoring process.

DISCLOSURE OF THE INVENTION

Technical Task

One technical task of the present invention is to provide an in-vehicle multi-camera based monitoring method to reinforce a vehicle safety function.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

In one technical aspect of the present invention, provided herein is an apparatus for monitoring an occupant, the apparatus including a camera obtaining an image in a vehicle and a processor processing the image. Moreover, the processor may include a detecting module separating each region in which an object exists from the image, a classifying module classifying the object existing in the each separated region and a recognizing module recognizing a pose of the occupant if the object corresponds to the occupant.

Learning data of an object model may be defined in advance based on deep learning and the detecting module may separate the object existing region using the learning data.

The learning data may be defined in advance based on vehicle 3D information on information of the vehicle and object 3D rendering information inputted from a user.

The detecting module may match up the learning data defined in advance with the obtained image in the vehicle, separate a seat region of the vehicle based on the matching, and separate the object existing region from the separated seat region.

If the object is a Chair Restriction Seat (CRS), the classifying module may detect an installed state of the CRS through image processing and detect a volume of the occupant in the CRS. Moreover, if the CRS is installed in a rear direction of the vehicle and the detected volume of the occupant is in a preset range, the processor may control an airbag to be turned off.

If a first object corresponding to the occupant and a second object corresponding to a thing exist in the separated region, the classifying module may detect a region in which the first and second objects overlap each other.

If the overlapped region is smaller than a preset first threshold, the recognizing module may recognize a pose of the first object using skeleton tracking. And, if the pose of the first object corresponds to a preset pose, the processor may output a warning or control on/off of an airbag.

If the overlapped region is equal to or greater than the preset first threshold, the recognizing module may detect an inclination of the first object based on a face position of the first object and a position of a center point of the second object. And, if the inclination is greater than a preset second threshold, the processor may output a warning or control on/off of an airbag.

The classifying module may extract a context of the first object based on a position of the second object. And, the processor may control at least one of the airbag, a display and/or an audio based on the extracted context.

Specific matters of other embodiments are included in the detailed description and drawings.

Advantageous Effects

According to an embodiment of the present invention, an occupant is detected, classified and recognized through an in-vehicle multi-camera based monitoring process, thereby outputting various output signals (e.g., a warning message) or controlling on/off of airbags correspondingly.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR INVENTION

Figure 1:
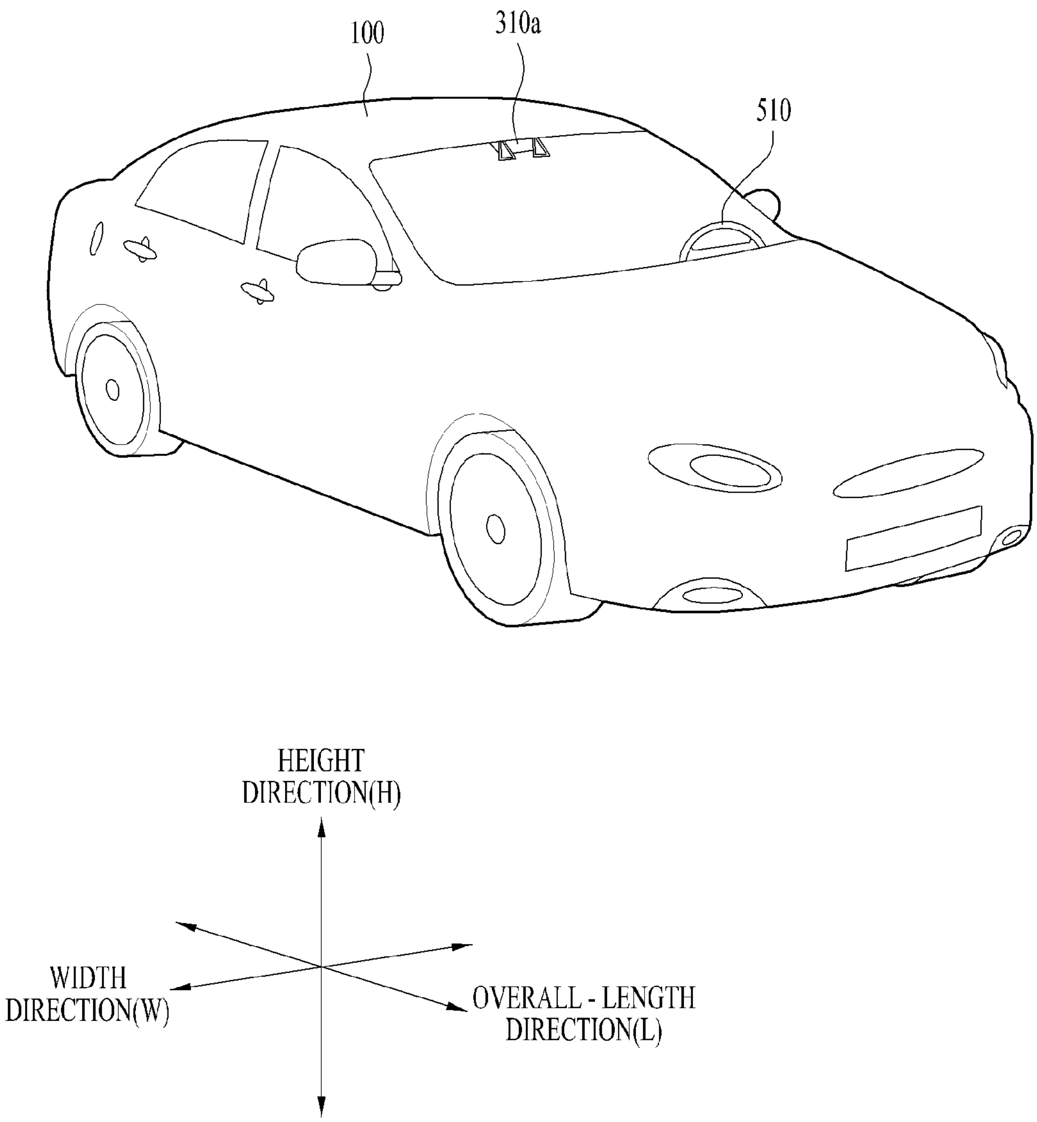
FIG. 1 is a diagram showing an exterior of a vehicle according to an embodiment of the present invention.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present invention.

It will be understood that although the terms "first," "second," etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise. In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include an automobile and a motorcycle. Hereinafter, a description will be given based on an automobile. A vehicle as described in this specification may include all of an internal combustion engine vehicle including an engine as a power source, a hybrid vehicle including both an engine and an electric motor as a power source, and an electric vehicle including an electric motor as a power source. In the following description, "the left side of the vehicle" refers to the left side in the forward driving direction of the vehicle, and "the right side of the vehicle" refers to the right side in the forward driving direction of the vehicle.

FIG. 1 is a view of the external appearance of a vehicle according to an embodiment of the present disclosure.

Figure 2:
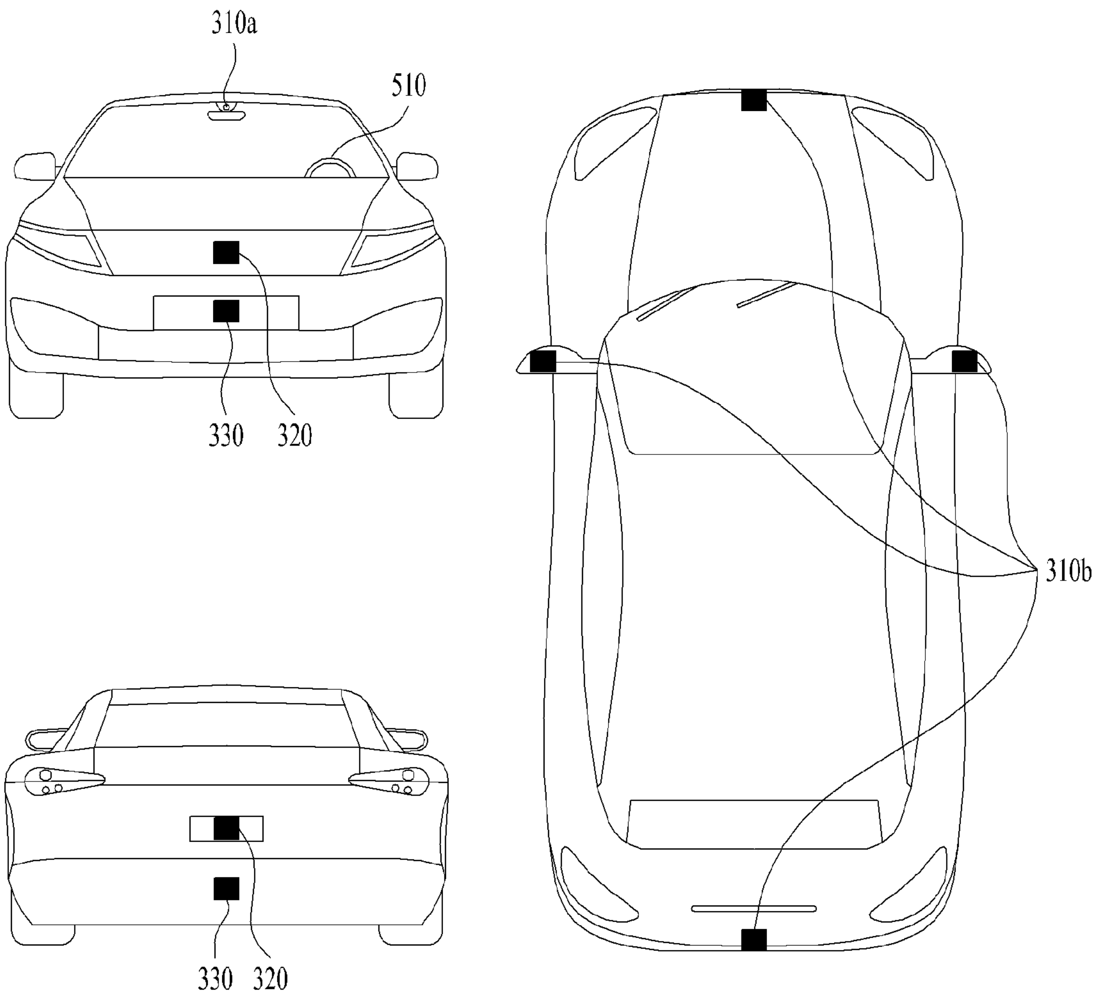
FIG. 2 is a diagram showing a vehicle externally viewed in various angles according to an embodiment of the present invention.

FIG. 2 is different angled views of a vehicle according to an embodiment of the present disclosure.

Figure 3:
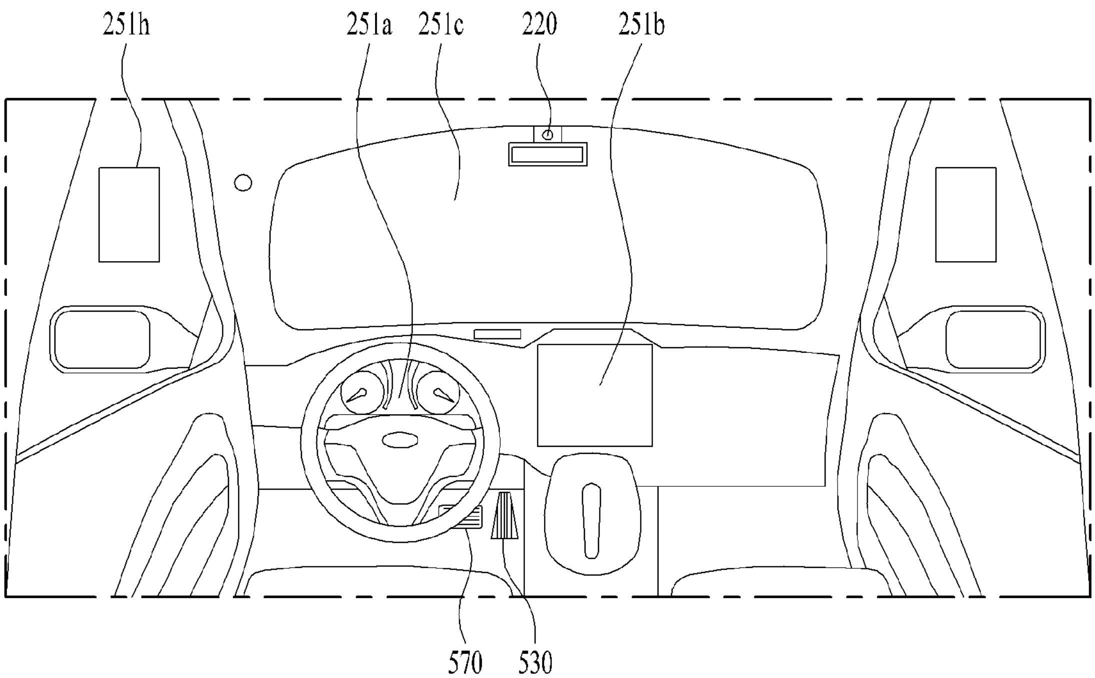
FIG. 3 and FIG. 4 are diagrams showing an interior of a vehicle according to an embodiment of the present invention.
Figure 4:
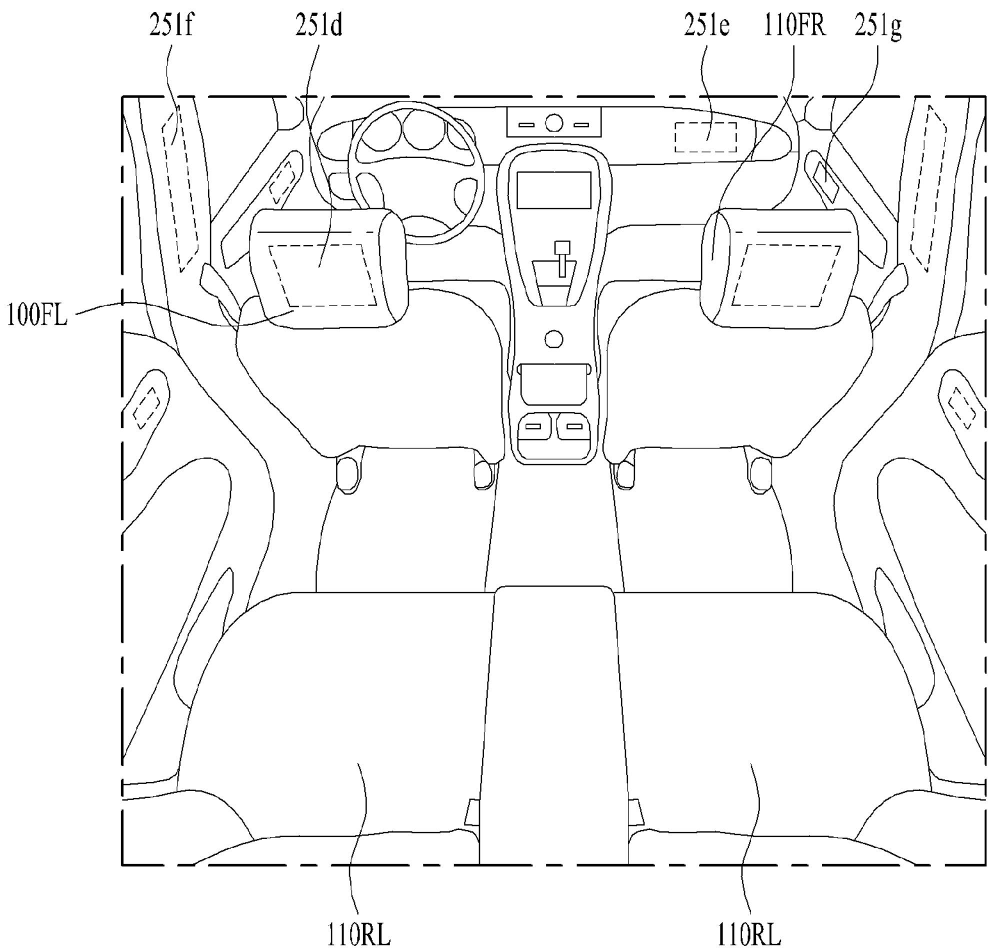

FIGS. 3 and 4 are views of the internal configuration of a vehicle according to an embodiment of the present disclosure.

Figure 5:
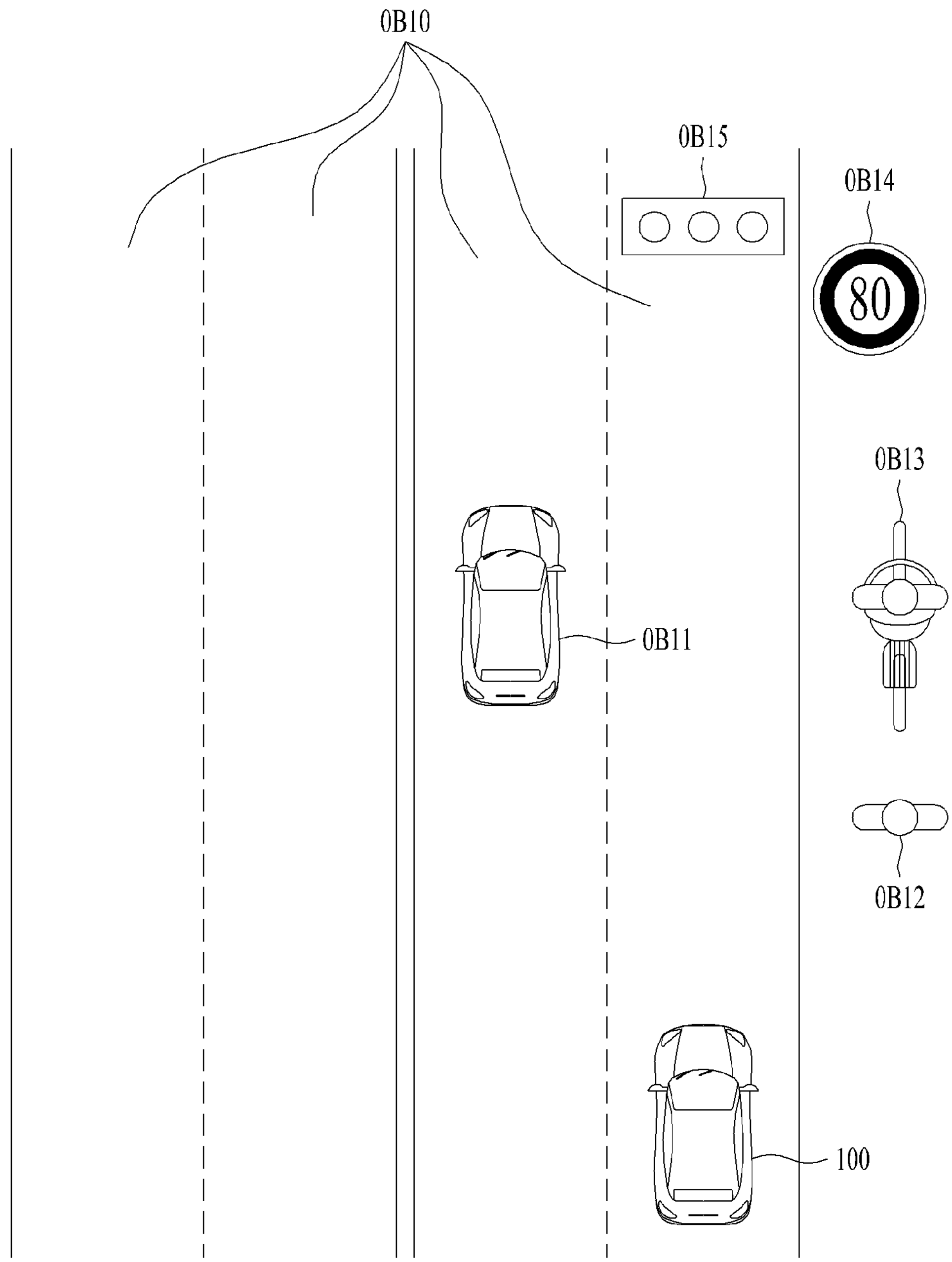
FIG. 5 and FIG. 6 are diagrams referred to for description of an object according to an embodiment of the present invention.
Figure 6:
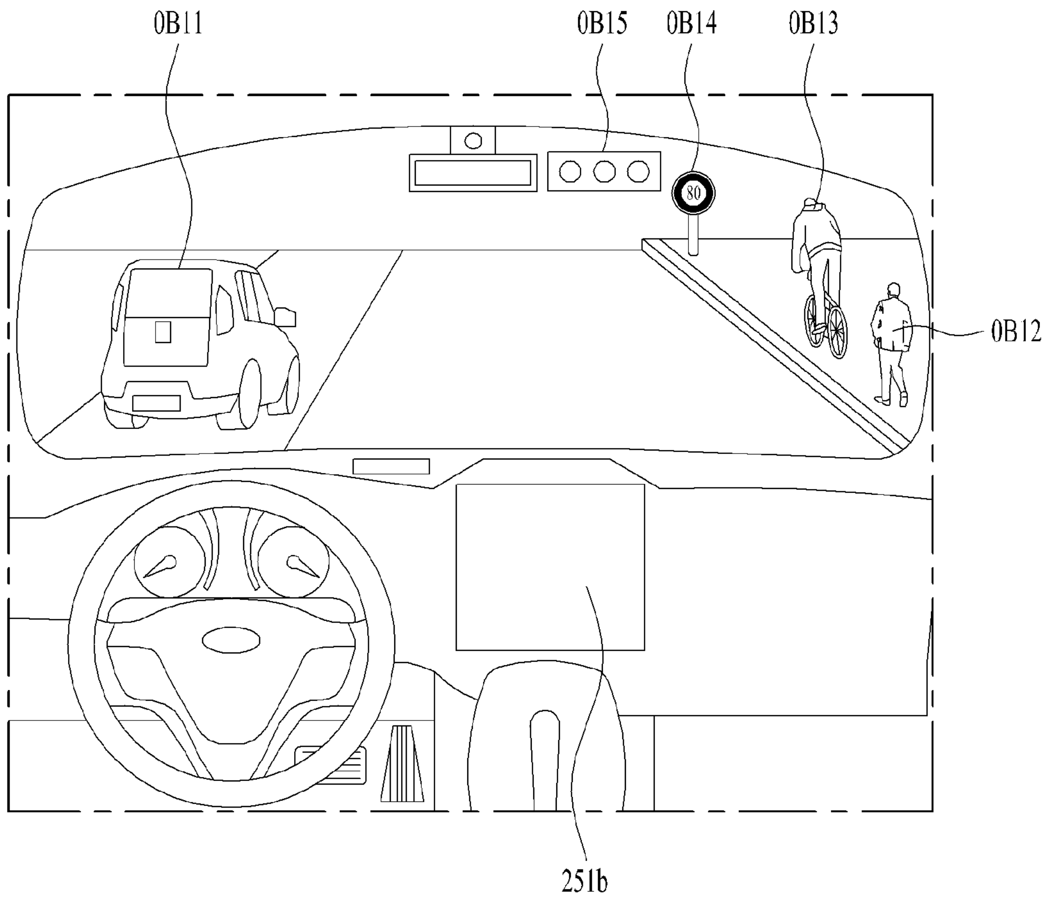

FIGS. 5 and 6 are views for explanation of objects according to an embodiment of the present disclosure.

Figure 7:
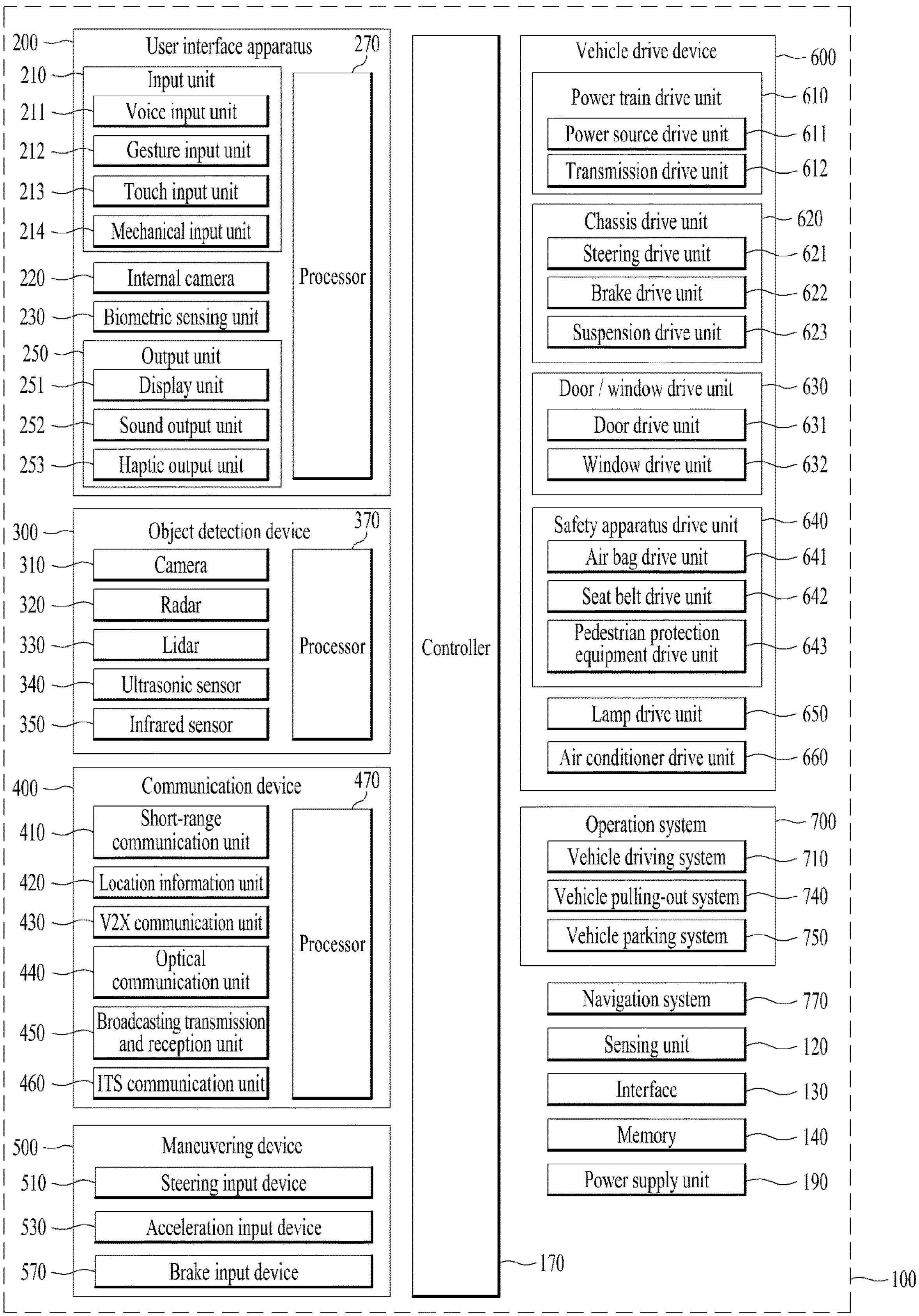
FIG. 7 is a block diagram referred to for description of a vehicle according to an embodiment of the present invention.

FIG. 7 is a block diagram illustrating a vehicle according to an embodiment of the present disclosure.

Referring to FIGS. 1 to 7, a vehicle 100 may include a plurality of wheels, which are rotated by a power source, and a steering input device 510 for controlling a driving direction of the vehicle 100.

The vehicle 100 may be an autonomous vehicle. The vehicle 100 may be switched to an autonomous mode or a manual mode in response to a user input. For example, in response to a user input received through a user interface apparatus 200, the vehicle 100 may be switched from a manual mode to an autonomous mode, or vice versa.

The vehicle 100 may be switched to the autonomous mode or to the manual mode based on driving environment information. The driving environment information may include at least one of the following: information on an object outside a vehicle, navigation information, and vehicle state information.

For example, the vehicle 100 may be switched from the manual mode to the autonomous mode, or vice versa, based on driving environment information generated by the object detection device 300. In another example, the vehicle 100 may be switched from the manual mode to the autonomous mode, or vice versa, based on driving environment information received through a communication device 400.

The vehicle 100 may be switched from the manual mode to the autonomous mode, or vice versa, based on information, data, and a signal provided from an external device.

When the vehicle 100 operates in the autonomous mode, the autonomous vehicle 100 may operate based on an operation system 700. For example, the autonomous vehicle 100 may operate based on information, data, or signals generated by a driving system 710, a vehicle pulling-out system 740, and a vehicle parking system 750.

While operating in the manual mode, the autonomous vehicle 100 may receive a user input for driving of the vehicle 100 through a maneuvering device 500. In response to the user input received through the maneuvering device 500, the vehicle 100 may operate.

The term "overall length" means the length from the front end to the rear end of the vehicle 100, the term "overall width" means the width of the vehicle 100, and the term "overall height" means the height from the bottom of the wheel to the roof. In the following description, the term "overall length direction L" may mean the reference direction for the measurement of the overall length of the vehicle 100, the term "overall width direction W" may mean the reference direction for the measurement of the overall width of the vehicle 100, and the term "overall height direction H" may mean the reference direction for the measurement of the overall height of the vehicle 100.

As illustrated in FIG. 7, the vehicle 100 may include the user interface device 200, the object detection device 300, the communication device 400, the maneuvering device 500, a vehicle drive device 600, the operation system 700, a navigation system 770, a sensing unit 120, an interface 130, a memory 140, a controller 170, and a power supply unit 190.

In some embodiments, the vehicle 100 may further include other components in addition to the aforementioned components, or may not include some of the aforementioned components. The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, outside illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle condition information may be information that is generated based on data sensed by a variety of sensors inside a vehicle.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

Meanwhile, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170. In some embodiments, the memory 140 may be integrally formed with the controller 170, or may be provided as an element of the controller 170.

The controller 170 may control the overall operation of each unit inside the vehicle 100. The controller 170 may be referred to as an Electronic Controller (ECU). The power supply unit 190 may supply power required to operate each component under control of the controller 170. In particular, the power supply unit 190 may receive power from, for example, a battery inside the vehicle 100.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Moreover, the sensing unit 120, the interface unit 130, the memory 140, the power supply unit 190, the user interface device 200, the object detection device 300, the communication device 400, the maneuvering device 500, the vehicle drive device 600, the operation system 700 and the navigation system 770 may have individual processors or be integrated into the controller 170.

The user interface device 200 is provided to support communication between the vehicle 100 and a user. The user interface device 200 may receive a user input, and provide information generated in the vehicle 100 to the user. The vehicle 100 may enable User Interfaces (UI) or User Experience (UX) through the user interface device 200.

The user interface device 200 may include an input unit 210, an internal camera 220, a biometric sensing unit 230, an output unit 250, and a processor 270. Each component of the user interface device 200 may be separated from or integrated with the afore-described interface 130, structurally or operatively.

In some embodiments, the user interface device 200 may further include other components in addition to the aforementioned components, or may not include some of the aforementioned components.

The input unit 210 is configured to receive information from a user, and data collected in the input unit 210 may be analyzed by the processor 270 and then processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170. The voice input unit 211 may include one or more microphones.

The gesture input unit 212 may convert a gesture input of a user into an electrical signal. The converted electrical signal may be provided to the processor 270 or the controller 170. The gesture input unit 212 may include at least one selected from among an infrared sensor and an image sensor for sensing a gesture input of a user.

In some embodiments, the gesture input unit 212 may sense a three-dimensional (3D) gesture input of a user. To this end, the gesture input unit 212 may include a plurality of light emitting units for outputting infrared light, or a plurality of image sensors. The gesture input unit 212 may sense the 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170. The touch input unit 213 may include a touch sensor for sensing a touch input of a user. In some embodiments, the touch input unit 210 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170. The mechanical input unit 214 may be located on a steering wheel, a center fascia, a center console, a cockpit module, a door, etc.

The processor 270 may start a learning mode of the vehicle 100 in response to a user input to at least one of the afore-described voice input unit 211, gesture input unit 212, touch input unit 213, or mechanical input unit 214. In the learning mode, the vehicle 100 may learn a driving route and ambient environment of the vehicle 100. The learning mode will be described later in detail in relation to the object detection device 300 and the operation system 700.

The internal camera 220 may acquire images of the inside of the vehicle 100. The processor 270 may sense a user's condition based on the images of the inside of the vehicle 100. The processor 270 may acquire information on an eye gaze of the user. The processor 270 may sense a gesture of the user from the images of the inside of the vehicle 100.

The biometric sensing unit 230 may acquire biometric information of the user. The biometric sensing unit 230 may include a sensor for acquire biometric information of the user, and may utilize the sensor to acquire finger print information, heart rate information, etc. of the user. The biometric information may be used for user authentication.

The output unit 250 is configured to generate a visual, audio, or tactile output. The output unit 250 may include at least one selected from among a display unit 251, a sound output unit 252, and a haptic output unit 253.

The display unit 251 may display graphic objects corresponding to various types of information. The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen. The display unit 251 may be implemented as a Head Up Display (HUD). When implemented as a HUD, the display unit 251 may include a projector module in order to output information through an image projected on a windshield or a window. The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

Meanwhile, the user interface device 200 may include a plurality of display units 251*a* to 251*g*.

The display unit 251 may be disposed in a region of a steering wheel, a region 251*a*, 251*b* or 251*e* of an instrument panel, a region 251*d* of a seat, a region 251*f* of each pillar, a region 251*g* of a door, a region of a center console, a region of a head lining, a region of a sun visor, a region 251*c* of a windshield, or a region 251*h* of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface device 200. In some embodiments, the user interface device 200 may include a plurality of processors 270 or may not include the processor 270.

In a case where the user interface device 200 does not include the processor 270, the user interface device 200 may operate under control of the controller 170 or a processor of a different device inside the vehicle 100. Meanwhile, the user interface device 200 may be referred to as a display device for vehicle. The user interface device 200 may operate under control of the controller 170.

The object detection device 300 is used to detect an object outside the vehicle 100. The object detection device 300 may generate object information based on sensing data.

The object information may include information about the presence of an object, location information of the object, information on distance between the vehicle and the object, and the speed of the object relative to the vehicle 100. The object may include various objects related to travelling of the vehicle 100.

Referring to FIGS. 5 and 6, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle 100 is traveling (hereinafter, referred to as the current driving lane), a lane next to the current driving lane, and a lane in which a vehicle travelling in the opposite direction is travelling. The lane OB10 may include left and right lines that define the lane.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100.

The pedestrian OB12 may be a person in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle that is located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface. The light may be light generated by a lamp provided in the nearby vehicle. The light may be light generated by a street light. The light may be solar light. The road may include a road surface, a curve, and slopes, such as an upward slope and a downward slope. The structure may be a body located around the road in the state of being fixed onto the ground. For example, the structure may include a streetlight, a roadside tree, a building, a traffic light, and a bridge. The geographical feature may include a mountain and a hill.

Meanwhile, the object may be classified as a movable object or a stationary object. For example, the movable object may include a nearby vehicle and a pedestrian. For example, the stationary object may include a traffic signal, a road, and a structure.

The object detection device 300 may include a camera 310, a radar 320, a lidar 330, an ultrasonic sensor 340, an infrared sensor 350, and a processor 370. Each component of the object detection device 300 may be separated from or integrated with the sensing unit 120, structurally or operatively.

In some embodiments, the object detection device 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera 310*a*, an Around View Monitoring (AVM) camera 310*b*, or a 360-degree camera.

Using various image processing algorithms, the camera 310 may acquire location information of an object, information on distance to the object, and information on speed relative to the object.

For example, based on change in size over time of an object in acquired images, the camera 310 may acquire information on distance to the object and information on speed relative to the object.

For example, the camera 310 may acquire the information on distance to the object and the information on speed relative to the object by utilizing a pin hole model or by profiling a road surface.

For example, the camera 310 may acquire the information on distance to the object and the information on the speed relative to the object, based on information on disparity of stereo images acquired by a stereo camera 310*a*.

For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate.

In yet another example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object.

The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar. When implemented as the drive type lidar, the lidar 300 may rotate by a motor and detect an object in the vicinity of the vehicle 100. When implemented as the non-drive type lidar, the lidar 300 may utilize a light steering technique to detect an object located within a predetermined distance from the vehicle 100.

The lidar 330 may detect an object through the medium of laser light by employing the TOF scheme or the phase-shift scheme, and may detect a location of the detected object, the distance to the detected object, and the speed relative to the detected object. The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object. The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object based on infrared light, and may detect a location of the detected object, the distance to the detected object, and the speed relative to the detected object. The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection device 300. The processor 370 may detect or classify an object by comparing data sensed by the camera 310, the radar 320, the lidar 330, the ultrasonic sensor 340, and the infrared sensor 350 with pre-stored data.

The processor 370 may detect and track an object based on acquired images. The processor 370 may, for example, calculate the distance to the object and the speed relative to the object.

For example, the processor 370 may acquire information on the distance to the object and information on the speed relative to the object based on a variation in size over time of the object in acquired images.

In another example, the processor 370 may acquire information on the distance to the object or information on the speed relative to the object by employing a pin hole model or by profiling a road surface.

In yet another example, the processor 370 may acquire information on the distance to the object and information on the speed relative to the object based on information on disparity of stereo images acquired from the stereo camera 310*a*.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

As described before, once the vehicle 100 starts the learning mode in response to a user input to the input unit 210, the processor 370 may store data sensed by the camera 310, the radar 320, the lidar 330, the ultrasonic sensor 340, and the infrared sensor 350 in the memory 140.

Each step of the learning mode based on analysis of stored data, and an operating mode following the learning mode will be described later in detail in relation to the operation system 700. According to an embodiment, the object detection device 300 may include a plurality of processors 370 or no processor 370. For example, the camera 310, the radar 320, the lidar 330, the ultrasonic sensor 340, and the infrared sensor 350 may include individual processors.

In a case where the object detection device 300 does not include the processor 370, the object detection device 300 may operate under control of the controller 170 or a processor inside the vehicle 100. The object detection device 300 may operate under control of the controller 170.

The communication device 400 is configured to perform communication with an external device. Here, the external device may be a nearby vehicle, a mobile terminal, or a server. To perform communication, the communication device 400 may include at least one selected from among a transmission antenna, a reception antenna, a Radio Frequency (RF) circuit capable of implementing various communication protocols, and an RF device.

The communication device 400 may include a short-range communication unit 410, a location information unit 420, a V2X communication unit 430, an optical communication unit 440, a broadcast transmission and reception unit 450, an Intelligent Transport Systems (ITS) communication unit 460, and a processor 470. In some embodiments, the communication device 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus). The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal. In some embodiments, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic information from the traffic system and provide the traffic information to the controller 170. In another example, the ITS communication unit 460 may receive a control signal from the traffic system, and provide the control signal to the controller 170 or a processor provided in the vehicle 100.

The processor 470 may control the overall operation of each unit of the communication device 400. In some embodiments, the communication device 400 may include a plurality of processors 470, or may not include the processor 470. In a case where the communication device 400 does not include the processor 470, the communication device 400 may operate under control of the controller 170 or a processor of a device inside of the vehicle 100.

Meanwhile, the communication device 400 may implement a vehicle display device, together with the user interface device 200. In this case, the vehicle display device may be referred to as a telematics device or an Audio Video Navigation (AVN) device. The communication device 400 may operate under control of the controller 170.

The maneuvering device 500 is configured to receive a user input for driving the vehicle 100. In the manual mode, the vehicle 100 may operate based on a signal provided by the maneuvering device 500. The maneuvering device 500 may include a steering input device 510, an acceleration input device 530, and a brake input device 570.

The steering input device 510 may receive a user input with regard to the direction of travel of the vehicle 100. The steering input device 510 may take the form of a wheel to enable a steering input through the rotation thereof. In some embodiments, the steering input device may be provided as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some embodiments, the acceleration input device or the break input device may be configured as a touch screen, a touch pad, or a button.

The maneuvering device 500 may operate under control of the controller 170.

The vehicle drive device 600 is configured to electrically control the operation of various devices of the vehicle 100. The vehicle drive device 600 may include a power train drive unit 610, a chassis drive unit 620, a door/window drive unit 630, a safety apparatus drive unit 640, a lamp drive unit 650, and an air conditioner drive unit 660. In some embodiments, the vehicle drive device 600 may further include other components in addition to the aforementioned components, or may not include some of the aforementioned components. Meanwhile, the vehicle drive device 600 may include a processor. Each unit of the vehicle drive device 600 may include its own processor.

The power train drive unit 610 may control the operation of a power train. The power train drive unit 610 may include a power source drive unit 611 and a transmission drive unit 612.

The power source drive unit 611 may control a power source of the vehicle 100. In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In a case where an electric motor is the power source, the power source drive unit 611 may control the motor. The power source drive unit 610 may control, for example, the RPM and toque of the motor under control of the controller 170.

The transmission drive unit 612 may control a transmission. The transmission drive unit 612 may adjust the state of the transmission. The transmission drive unit 612 may adjust a state of the transmission to a drive (D), reverse (R), neutral (N), or park (P) state. Meanwhile, in a case where an engine is the power source, the transmission drive unit 612 may adjust a gear-engaged state to the drive position D.

The chassis drive unit 620 may control the operation of a chassis. The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

Meanwhile, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100. Meanwhile, the suspension drive unit 623 may control a plurality of suspensions individually.

The door/window drive unit 630 may perform electronic control of a door apparatus or a window apparatus inside the vehicle 100. The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100. The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive device 600 may include a processor. Each unit of the vehicle dive device 600 may include its own processor. The vehicle drive device 600 may operate under control of the controller 170.

The operation system 700 is a system for controlling the overall driving operation of the vehicle 100. The operation system 700 may operate in the autonomous driving mode.

The operation system 700 may include the driving system 710, the vehicle pulling-out system 740, and the vehicle parking system 750. In some embodiments, the operation system 700 may further include other components in addition to the aforementioned components, or may not include some of the aforementioned component. Meanwhile, the operation system 700 may include a processor. Each unit of the operation system 700 may include its own processor.

Meanwhile, the operation system 700 may control driving in the autonomous mode based on learning. In this case, the learning mode and an operating mode based on the premise of completion of learning may be performed. A description will be given below of a method of executing the learning mode and the operating mode by the processor of the operation system 700.

The learning mode may be performed in the afore-described manual mode. In the learning mode, the processor of the operation system 700 may learn a driving route and ambient environment of the vehicle 100.

The learning of the driving route may include generating map data for a route in which the vehicle 100 drives. Particularly, the processor of the operation system 700 may generate map data based on information detected through the object detection device 300 during driving from a departure to a destination.

The learning of the ambient environment may include storing and analyzing information about an ambient environment of the vehicle 100 during driving and parking. Particularly, the processor of the operation system 700 may store and analyze the information about the ambient environment of the vehicle based on information detected through the object detection device 300 during parking of the vehicle 100, for example, information about a location, size, and a fixed (or mobile) obstacle of a parking space.

The operating mode may be performed in the afore-described autonomous mode. The operating mode will be described based on the premise that the driving route or the ambient environment has been learned in the learning mode.

The operating mode may be performed in response to a user input through the input unit 210, or when the vehicle 100 reaches the learned driving route and parking space, the operating mode may be performed automatically.

The operating mode may include a semi-autonomous operating mode requiring some user's manipulations of the maneuvering device 500, and a full autonomous operating mode requiring no user's manipulation of the maneuvering device 500.

According to an embodiment, the processor of the operation system 700 may drive the vehicle 100 along the learned driving route by controlling the operation system 710 in the operating mode.

According to an embodiment, the processor of the operation system 700 may pull out the vehicle 100 from the learned parking space by controlling the vehicle pulling-out system 740 in the operating mode.

According to an embodiment, the processor of the operation system 700 may park the vehicle 100 in the learned parking space by controlling the vehicle parking system 750 in the operating mode. Meanwhile, in some embodiments, in a case where the operation system 700 is implemented as software, the operation system 700 may be a subordinate concept of the controller 170.

Meanwhile, in some embodiments, the operation system 700 may be a concept including at least one selected from among the user interface device 200, the object detection device 300, the communication device 400, the vehicle drive device 600, and the controller 170.

The driving system 710 may perform driving of the vehicle 100. The driving system 710 may perform driving of the vehicle 100 by providing a control signal to the vehicle drive device 600 in response to reception of navigation information from the navigation system 770.

The driving system 710 may perform driving of the vehicle 100 by providing a control signal to the vehicle drive device 600 in response to reception of object information from the object detection device 300. The driving system 710 may perform driving of the vehicle 100 by providing a control signal to the vehicle drive device 600 in response to reception of a signal from an external device through the communication device 400.

Conceptually, the driving system 710 may be a system that drives the vehicle 100, including at least one of the user interface device 200, the object detection device 300, the communication device 400, the maneuvering device 500, the vehicle drive device 600, the navigation system 770, the sensing unit 120, or the controller 170. The driving system 710 may be referred to as a vehicle driving control device.

The vehicle pulling-out system 740 may perform an operation of pulling the vehicle 100 out of a parking space. The vehicle pulling-out system 740 may perform an operation of pulling the vehicle 100 out of a parking space, by providing a control signal to the vehicle drive device 600 in response to reception of navigation information from the navigation system 770.

The vehicle pulling-out system 740 may perform an operation of pulling the vehicle 100 out of a parking space, by providing a control signal to the vehicle drive device 600 in response to reception of object information from the object detection device 300.

The vehicle pulling-out system 740 may perform an operation of pulling the vehicle 100 out of a parking space, by providing a control signal to the vehicle drive device 600 in response to reception of a signal from an external device.

Conceptually, the vehicle pulling-out system 740 may be a system that performs pulling-out of the vehicle 100, including at least one of the user interface device 200, the object detection device 300, the communication device 400, the maneuvering device 500, the vehicle drive device 600, the navigation system 770, the sensing unit 120, or the controller 170.

The vehicle pulling-out system 740 may be referred to as a vehicle pulling-out control device.

The vehicle parking system 750 may perform an operation of parking the vehicle 100 in a parking space. The vehicle parking system 750 may perform an operation of parking the vehicle 100 in a parking space, by providing a control signal to the vehicle drive device 600 in response to reception of navigation information from the navigation system 770.

The vehicle parking system 750 may perform an operation of parking the vehicle 100 in a parking space, by providing a control signal to the vehicle drive device 600 in response to reception of object information from the object detection device 300.

The vehicle parking system 750 may perform an operation of parking the vehicle 100 in a parking space, by providing a control signal to the vehicle drive device 600 in response to reception of a signal from an external device.

Conceptually, the vehicle parking system 750 may be a system that performs parking of the vehicle 100, including at least one of the user interface device 200, the object detection device 300, the communication device 400, the maneuvering device 500, the vehicle drive device 600, the navigation system 770, the sensing unit 120, or the controller 170.

The vehicle parking system 750 may be referred to as a vehicle parking control device.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some embodiments, the navigation system 770 may update pre-stored information by receiving information from an external device through the communication device 400. In some embodiments, the navigation system 770 may be classified as an element of the user interface device 200.

Figure 8:
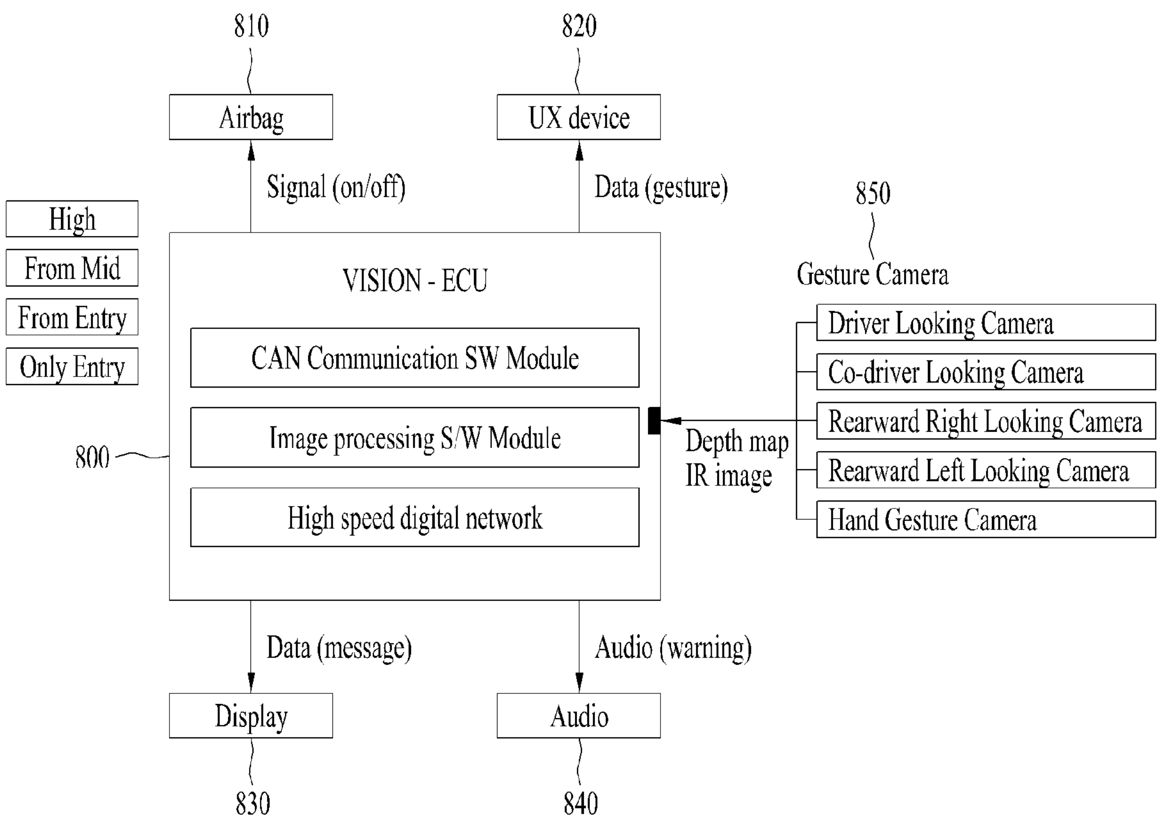
FIG. 8 shows hardware architecture for occupant monitoring according to one aspect of the present invention.

FIG. 8 shows hardware architecture for occupant monitoring according to one aspect of the present invention.

A VISION-ECU (or processor 800) may include an occupant detecting unit, an occupant classifying unit and an occupant pose recognizing unit in form of software modules. Meanwhile, 'processor' used in the following may mean the VISION-ECU of FIG. 8. The occupant detecting unit may mean a detecting module, the occupant classifying unit may mean a classifying unit, and the occupant pose recognizing unit may mean a recognizing module.

Referring to FIG. 8, the processor 800 can output various signals according to results of occupant monitoring performed by the occupant detecting unit, the occupant classifying unit and the occupant pose recognizing unit.

For example, the processor 800 can output a signal for turning on/off an airbag 810 based on a result of the occupant monitoring. According to one aspect of the present invention, the processor 800 can control the airbag drive unit 641 to turn on/off the air bag 810. Or, the processor 800 may output gesture data, message data and audio warning to a UX device 820, a display 830 and an audio 840, respectively.

Meanwhile, each of the occupant detecting unit, the occupant classifying unit and the occupant pose recognizing unit may be provided in form of a software module that performs an operation according to algorithm of its own. An occupant monitoring method according to one aspect of the present invention may include an occupant detecting step, an occupant classifying step and an occupant's pose recognizing step.

Meanwhile, in FIG. 8, a gesture camera 850 is exemplary and can be substituted with any camera capable of outputting a depth map or an IR image.

Meanwhile, the respective components shown in FIG. 8 may be selectively provided to a vehicle according to a class (or option) of the vehicle. For example, in case that a class of a vehicle is entry, the vehicle can be designed to include the processor 800, the UX device 820 and a hand gesture camera only. Or, if a class of a vehicle is mid, the vehicle can be designed to include the processor 800, the UX device 820, the hand gesture camera, a driver looking camera, a co-driver looking camera, the display 830, the audio 840 and the airbag 810. Or, if a class of a vehicle is high, the vehicle can be designed to include the processor 800, the UX device 820, the hand gesture camera, a driver looking camera, the co-driver looking camera, a rearward right looking camera, a rearward left looking camera, the display 830, the audio 840 and the airbag 810.

Figure 9:
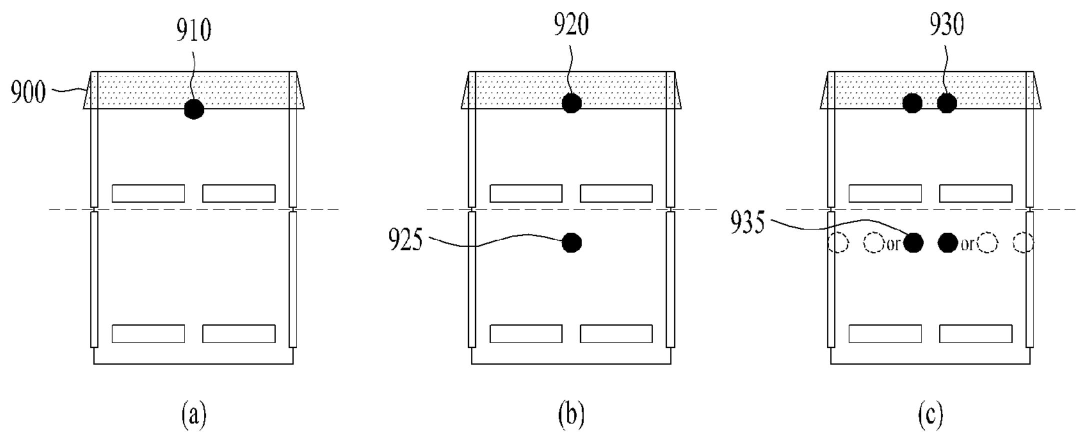
FIG. 9 shows a position of a camera for occupant monitoring according to one aspect of the present invention.

FIG. 9 shows a position of a camera for occupant monitoring according to one aspect of the present invention.

A camera used for occupant monitoring may include a 2D based camera (e.g., RGB, IR) or a 3D based camera (e.g., ToF, stereo) and a use range varies according to a function and position. For example, 1 to 4 cameras may be installed and the number of cameras may be adjusted according to an implemented region of an application.

Referring to FIG. 9 (*a*), a camera 910 can be disposed in a prescribed region of a wind shield 900 in a first row of a vehicle. Namely, the camera 910 is disposed in the first row of the vehicle and can monitor a driver seat or a co-driver seat (or front passenger seat) only. In this case, a major function of the camera 910 may be to detect a hand gesture of an occupant.

Referring to FIG. 9 (*b*), a camera 920 and a camera 925 can be disposed in a first row and a second row of a vehicle, respectively. Namely, the cameras 920 and 925 are disposed in the first and second rows of the vehicle, respectively, thereby monitoring all occupants. In this case, major functions of the cameras 920 and 925 may include occupant detection, classification, and pose/behavior hand gesture detection.

Referring to FIG. 9 (*c*), two cameras 930 can be disposed in a first row of a vehicle and two cameras 935 can be disposed in a second row of the vehicle. Namely, the cameras 930 and 935 are disposed in the first and second rows of the vehicle, respectively, thereby monitoring all occupants. In this case, major functions of the cameras 930 and 935 may include occupant detection, classification, pose/behavior with door, and hand gesture detection.

Meanwhile, according to one aspect of the present invention, cameras more than those shown in FIG. 9 (*c*) may be provided to a vehicle for more specific monitoring.

Figure 10:
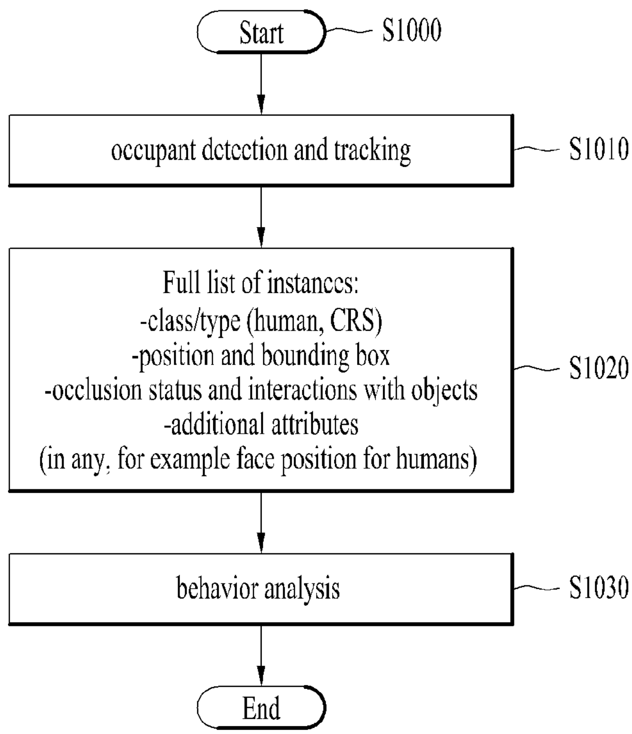
FIG. 10 is a schematic flowchart of an in-vehicle monitoring method according to one aspect of the present invention.

FIG. 10 is a schematic flowchart of an in-vehicle monitoring method according to one aspect of the present invention.

First of all, as an initial input, a depth map and an IR image through a 3D camera sensor can be received [S1000]. Particularly, information obtained from the gesture camera (e.g., ToF camera) described in FIG. 8 or FIG. 9 can be received.

An occupant detecting unit (detection module) can detect whether an occupant has boarded a vehicle [S1010]. Particularly, the occupant detecting unit can detect whether an object is a human or a non-human object using a camera and then segment each region [segmentation].

Subsequently, an occupant classifying unit (classification module) classifies each information in the region segmented by the occupant detecting unit [S1020]. Particularly, the occupant classifying unit can classify a human or a Chair Restriction Seat (CRS) (or a car seat) in the segmented region.

Subsequently, an occupant pose recognizing unit may recognize an occupant's pose and then output a corresponding warning [S1030]. Particularly, the occupant pose recognizing unit may recognize an occupant's pose based on occupant's skeleton extraction (or tracking) and then output a warning.

Figure 11:
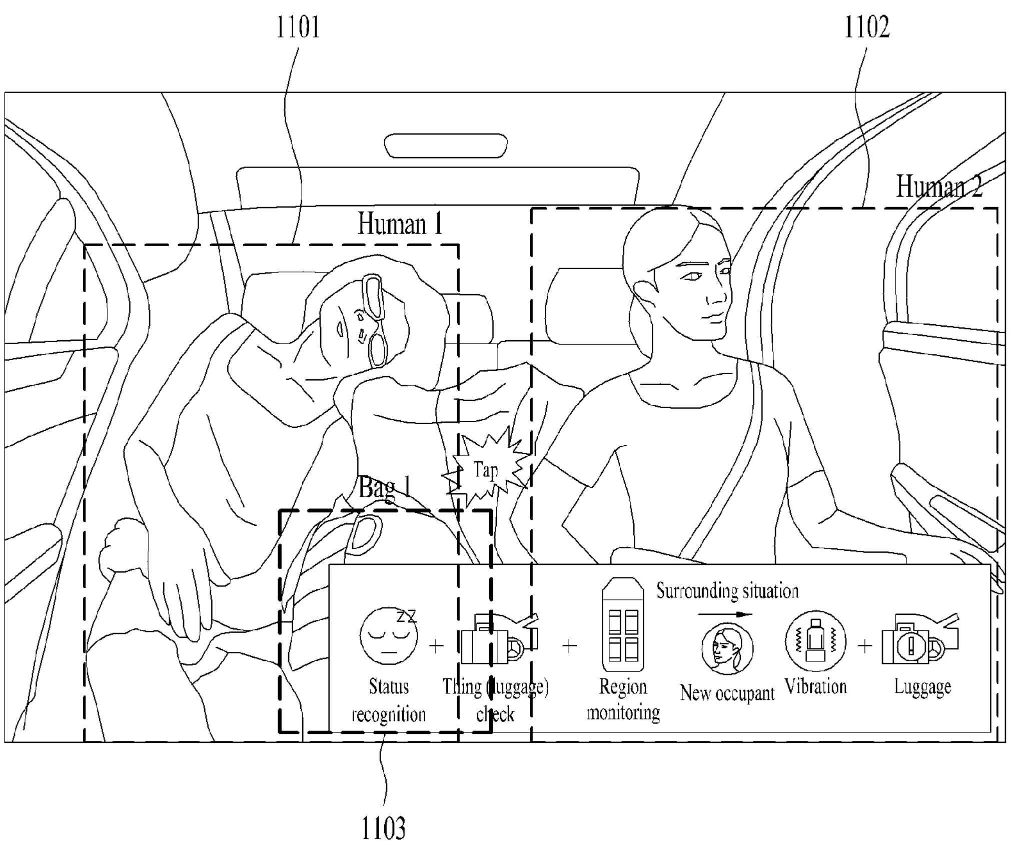
FIGS. 11 to 13 are diagrams to describe an operation of an occupant detecting unit in an occupant monitoring method according to one aspect of the present invention.
Figure 12:
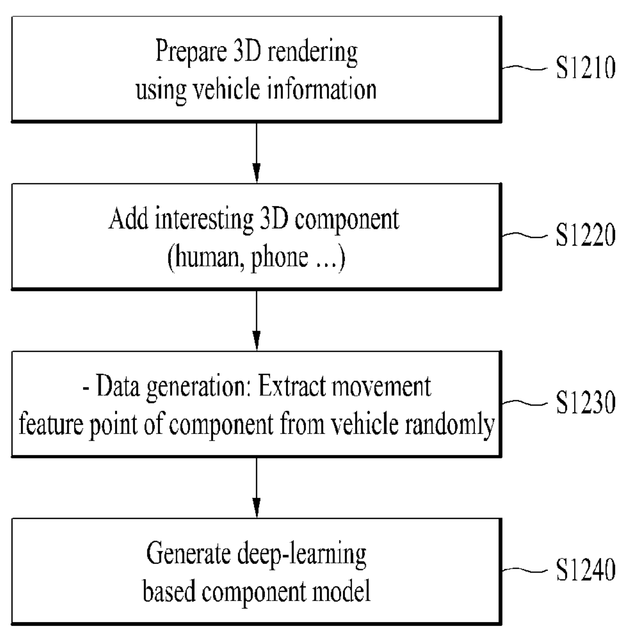
Figure 13:
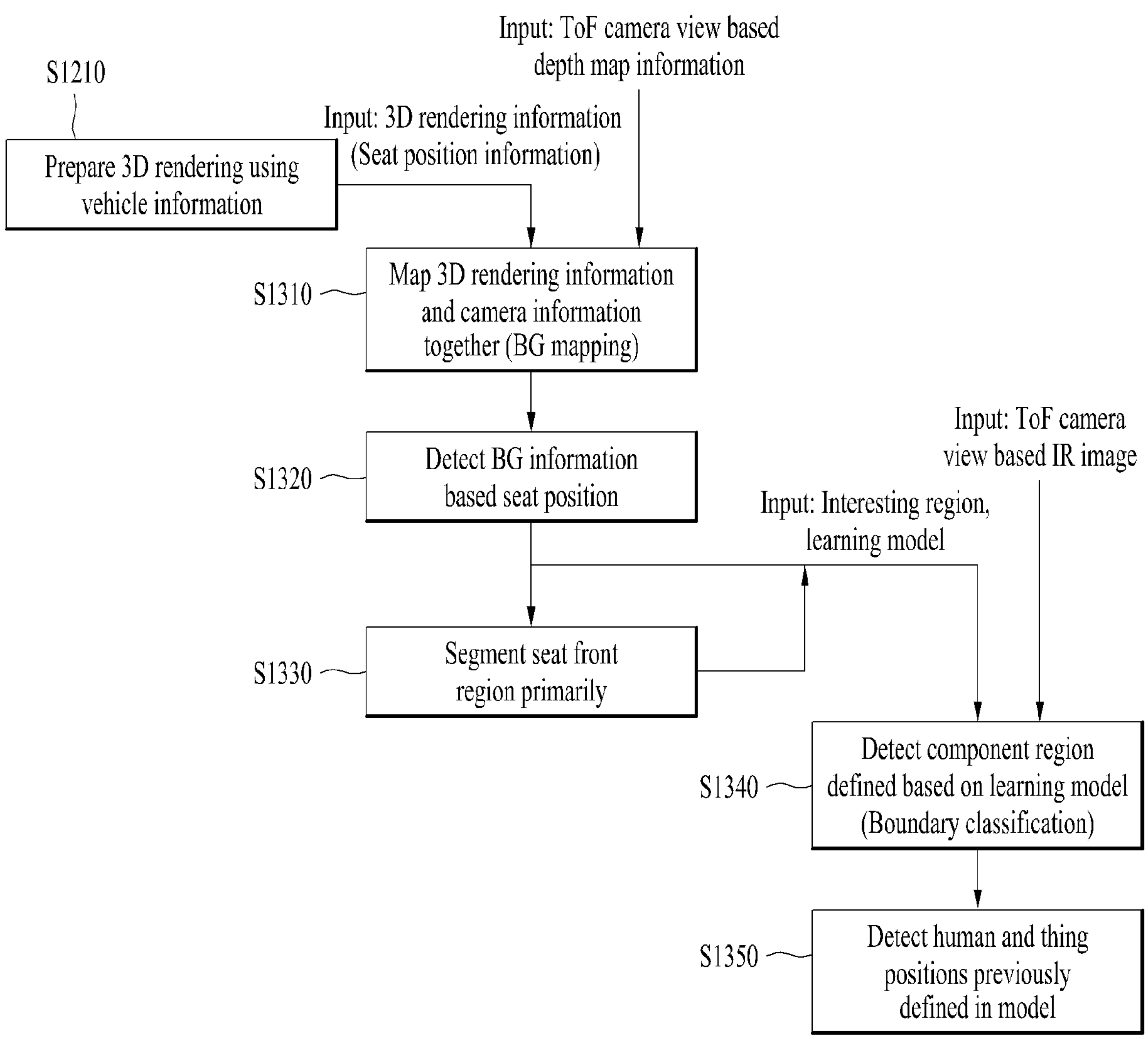

FIGS. 11 to 13 are diagrams to describe an operation of an occupant detecting unit in an occupant monitoring method according to one aspect of the present invention. Referring to FIG. 11, it can be observed that human 1 and human 2 are recognized by a camera (e.g., gesture camera of FIG. 8) in a second row of a vehicle.

An occupant detecting unit may detect a bag 1103 in a region 1101 of the recognized human 1. Moreover, the occupant detecting unit may detect that the detected bag 1103 is going to deviate from the region 1101 of the human 1 and enter a region 1102 of the human 2. According to one aspect of the present invention, in this case, an output signal is generated on a system and a warning (audio or video) can be outputted through an application. For example, it is possible to give a warning to an occupant through the display 830 or the audio 840 shown in FIG. 8.

FIG. 12 is a diagram showing a method of generating a learning model from an operation of an occupant detecting unit. According to one aspect of the present invention, the learning model generation of FIG. 12 may be understood as generation of learning data and performed in advance instead of operating by real time.

Particularly, an occupant detecting unit may generate 3D rendering using vehicle information [S1210]. An output of the step S1210 may include vehicle 3D rendering information by a 3D rendering tool.

Subsequently, the occupant detecting unit may add an interesting 3D component (or object) such as a human, a phone or a bag [S1220]. An output of the step S1220 may include an interesting object rendering by the 3D rendering tool.

Subsequently, the occupant detecting unit may randomly extract a movement feature point of an object in a vehicle [S1230]. The step S1230 may be named data generation and an output may include a feature point of a rending object by the 3D rendering tool.

Finally, the occupant detecting unit may generate a model of each component based on deep learning [S1240]. And output of the step S1240 may include a learning model per component.

FIG. 13 is a diagram to describe primary region segmentation and specific region segmentation in an operation of an occupant directing unit. First of all, assume that the occupant detecting unit: (i) obtains 3D rendering information (e.g., position information of a seat) according to the step S1210 of FIG. 12; and (ii) receives ToF camera view based depth map information.

The occupant directing unit matches learning data (e.g., 3D rendering information) and camera information together [S1310], detects a seat region or a seat position based on BackGround (BG) information [S1320], and primarily segments a seat front region [S1330]. As a result of the steps S1310 to S1330, coordinates of an in-vehicle interesting region (e.g., coordinates of the seat front region) are generated.

Subsequently, the occupant directing unit detects a component region defined according to a learning model based on an initial input, i.e., an obtained in-vehicle image (e.g., ToF camera view based IR image), coordinates of an interesting region and a learning model [S1340]. Then, the occupant detecting unit finally detects a human defined in the learning model and a boundary position of a thing (e.g., IR image and depth map coordinates) [S1350].

Figure 14:
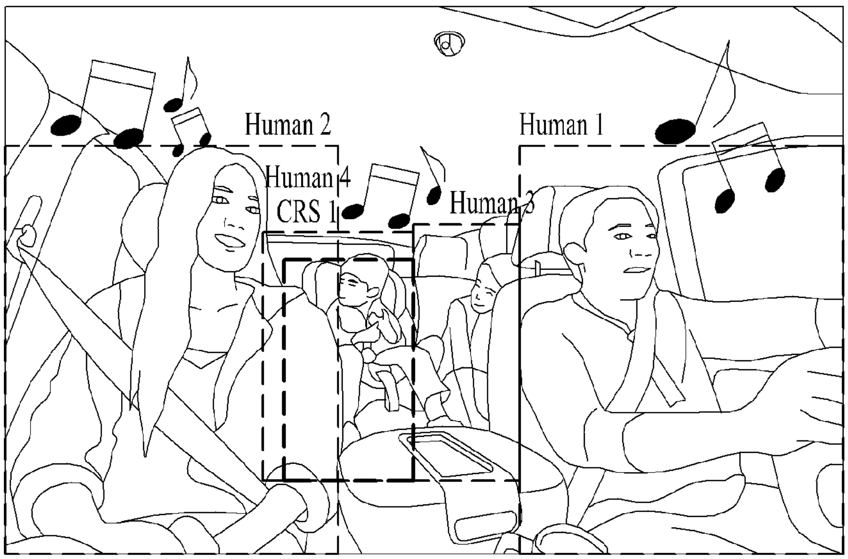
FIGS. 14 to 16 are diagrams to describe an operation of an occupant classifying unit in an occupant monitoring method according to one aspect of the present invention.
Figure 14:
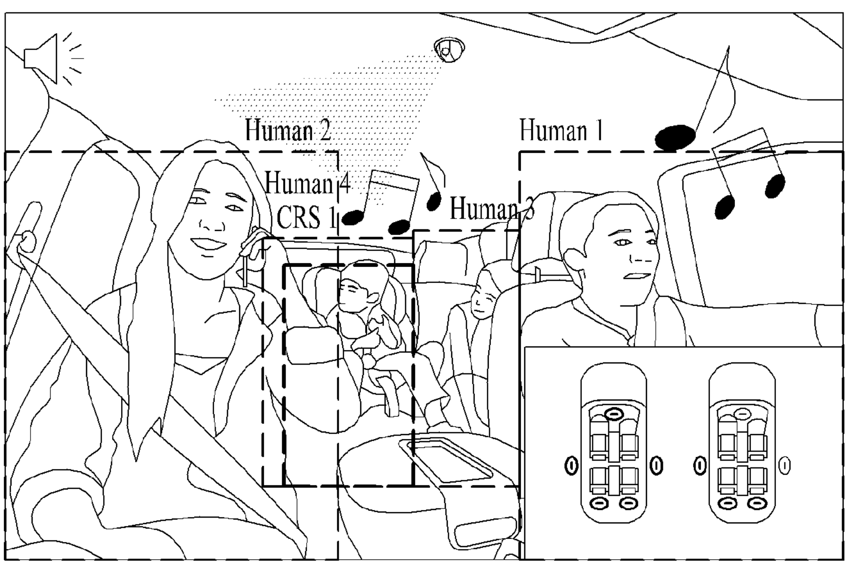
Figure 15:
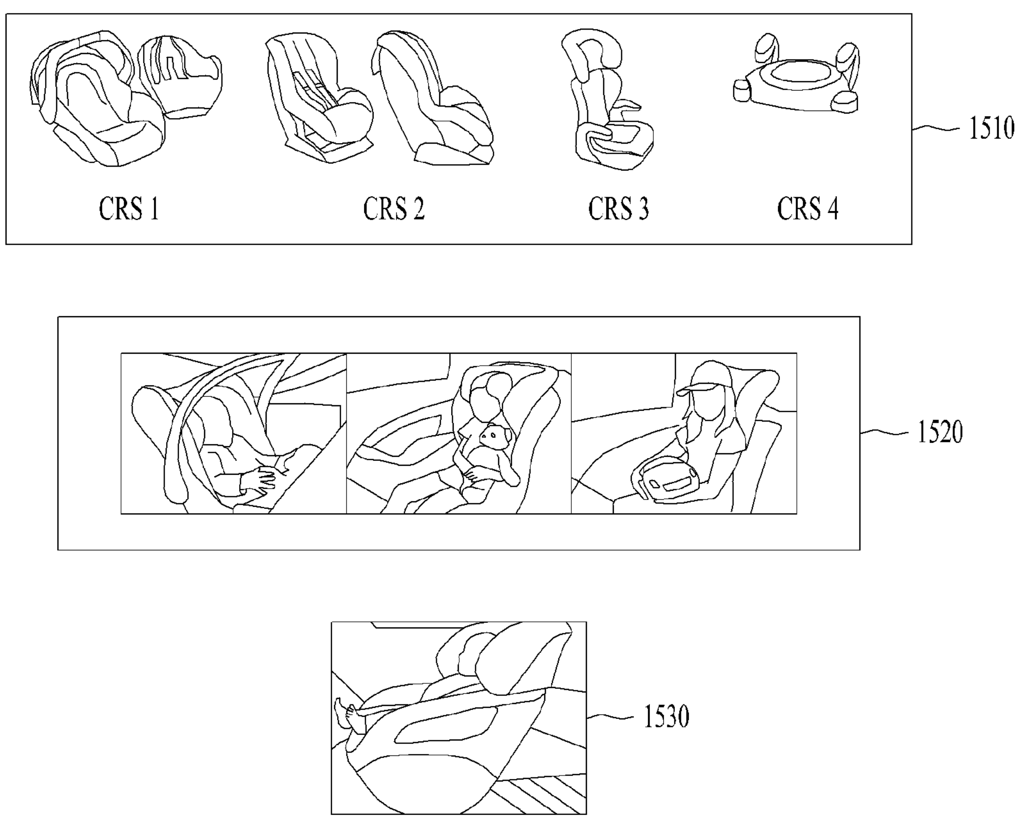
Figure 16:
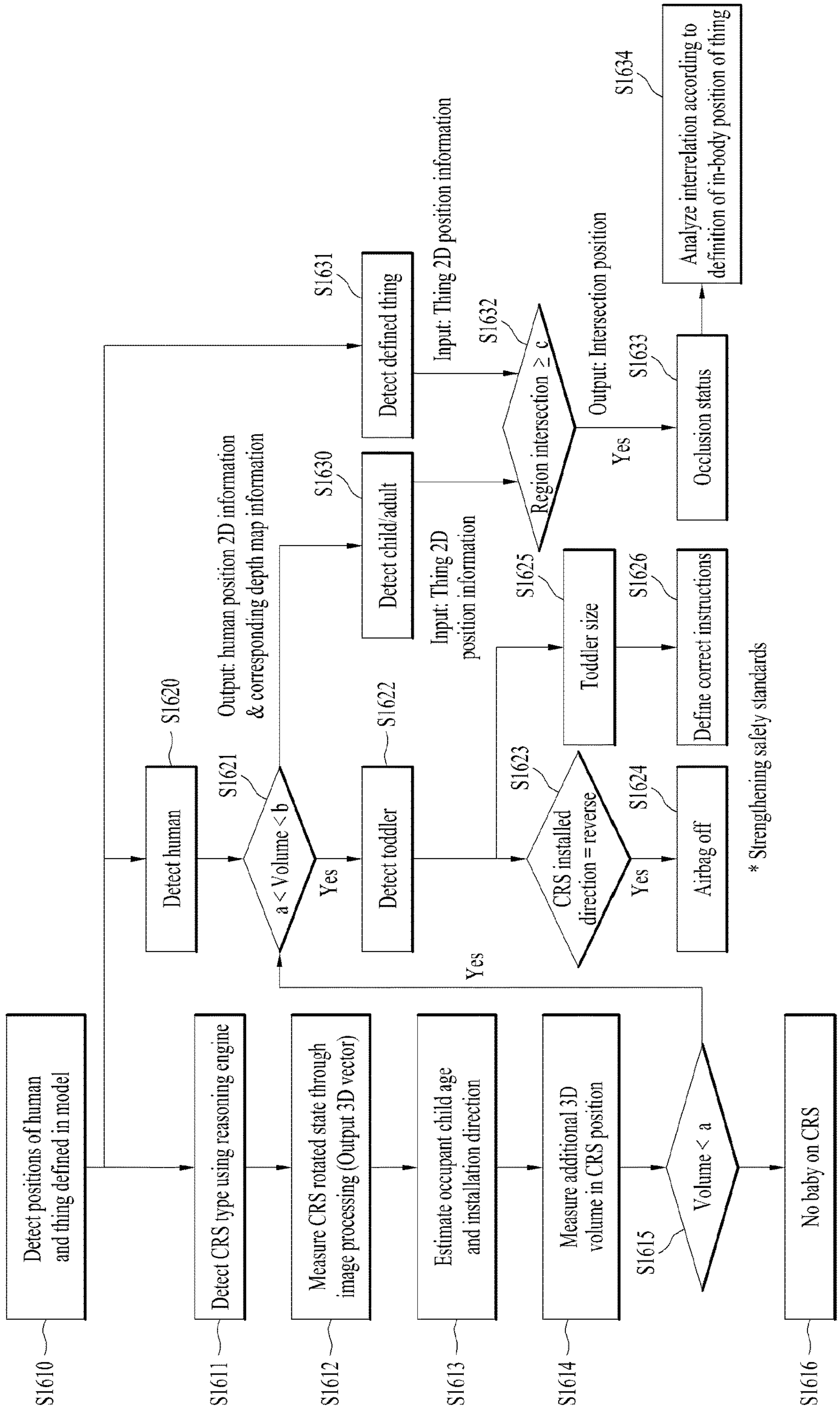

FIGS. 14 to 16 are diagrams to describe an operation of an occupant classifying unit in an occupant monitoring method according to one aspect of the present invention.

An occupant classifying unit classifies information based on a segmented region. Namely, the occupant classifying unit can determine: (i) whether each region is a region corresponding to a human or a region corresponding to a thing; (ii) an in-vehicle position of a segmented region (unique ID); and (iii) an interference level and interrelation between a disposed human and thing.

Referring to FIG. 14 (*a*), it can be confirmed that human 1 to human 4 regions are detected. An occupant classifying unit may classify the human 1 region, the human 2 region, the human 3 region and the human 4 region as 'driver seat, no interaction', 'co-Driver seat, no interaction', 'rear right seat, no interaction' and 'rear center seat, with CRS 1', respectively.

Meanwhile, the occupant classifying unit may estimate an occupant age of the human 4 region by recognizing a class of the CRS. This shall be described in detail with reference to FIG. 15.

Referring to FIG. 14 (*b*) behind FIG. 14 (*a*) in time, the occupant classifying unit may classify the human 1 region, the human 2 region, the human 3 region and the human 4 region as 'driver seat, no interaction', 'co-Driver seat, person with phone', 'rear right seat, no interaction' and 'rear center seat, with CRS 1', respectively.

Comparing FIG. 14 (*a*) with FIG. 14 (*b*), it can be observed that an occupant status of the human 2 region is changed into 'person with phone' from 'no interaction'. Thus, in an occupant monitoring method according to one aspect of the present invention, the occupant classifying unit can detect an occupant's behavior change in a detected occupant region, thereby generating an appropriate output. For example, if it is analyzed by the occupant classifying unit that 'human 2 is talking on the phone', a subsequent operation of lowering a speaker volume of the human 2 region can be performed.

Referring to FIG. 15, an occupant classifying unit can estimate an occupant's age through a definition of a CRS type 1510. To this end, CRS 1, CRS 2, CRS 3 and CRS 4 may be classified in advance as 'infants (0-2 years)', 'small child (3-6 years)', 'big child (7-10 years)' and 'booster type for big child (<10 years'), respectively.

The occupant classifying unit according to one aspect of the present invention may primarily extract a type of CRS in a human region from a depth map or IR image, detect a size of an occupant in the human region, and determine whether the detected size of the occupant matches the extracted CRS type.

Meanwhile, according to the international safety standards, as shown in FIG. 15, CRS should be installed in a rear direction 1530 for the safety of an occupant (e.g., a child). Hence, in case that CRS is installed in a rear direction in a second row of a vehicle, an airbag of the second row of the vehicle should be designed not to be triggered [i.e., airbag-off]. According to a related art, in case that CRS is installed in a rear direction in a second row of a vehicle, airbag-off is applied in a manual manner like a button input.

An occupant monitoring method according to one aspect of the present invention proposes a method of outputting a warning in an automatic manner based on occupant recognition and classification instead of a related art manual manner and further turning on/off an airbag.

FIG. 16 is a diagram to describe an overall flowchart of FIG. 14 and FIG. 15 referred to in the above description. Particularly, in FIG. 16, steps S1610 to S1616 relate to a method of estimating an age of an occupant, steps S1620 to S1636 relate to a processing method in case that an occupant is a toddler, and steps S1630 to S1634 relate to a processing method in case that an occupant is a child or adult and that occlusion by a thing occurs.

An occupant classifying unit detects positions of a human and thing defined in a learning model [S1610], detects a CRS type using a reasoning engine [S1611], measures (or detects) a rotated state of a CRS through image processing [S1612], estimates an occupant's age and installation direction [S1613], measures a 3D volume in a CRS position (or region) additionally [S1614], an compares the measured volume with a threshold a [S1615]. If the measured volume is smaller than the threshold a, the occupant classifying unit determines that there is no occupant on the CRS [S1616].

If a human is detected [S1620], the occupant classifying unit determines whether the measured volume is greater than the threshold a and smaller than a threshold b [S1621]. If so, the occupant classifying unit determines that the occupant is a toddler [S1622]. The occupant classifying unit determines whether a CRS installed direction is a reverse direction (e.g., a rear direction of a vehicle) [S1623]. If so, the occupant classifying unit turns off an airbag [S1624]. Meanwhile, if the occupant classifying unit determines that the occupant is the toddler according to the step S1622, the occupant classifying unit additionally detects a size of the toddler [S1625] and determines whether the CRS is used appropriately [S1626].

Meanwhile, if the volume is greater than the threshold b in the step S1621, the occupant classifying unit detects whether the occupant is a child or adult [S1630]. If a defined thing (e.g., phone, bag, bottle, cigarette, etc.) is detected [S1631], the occupant classifying unit determines whether a region in which the occupant region determined in the step S1630 overlaps with the detected thing region is greater than a threshold c [S1632]. If the overlapping region is greater than the threshold c, the occupant classifying unit determines that it is an occlusion status [S1633] and analyzes a position and interrelation of the thing region within the occupant region [S1634]. For example, if a thing is a phone and located in an ear region of an occupant, the occupant classifying unit can extract a context 'occupant is talking on the phone'.

Figure 17:
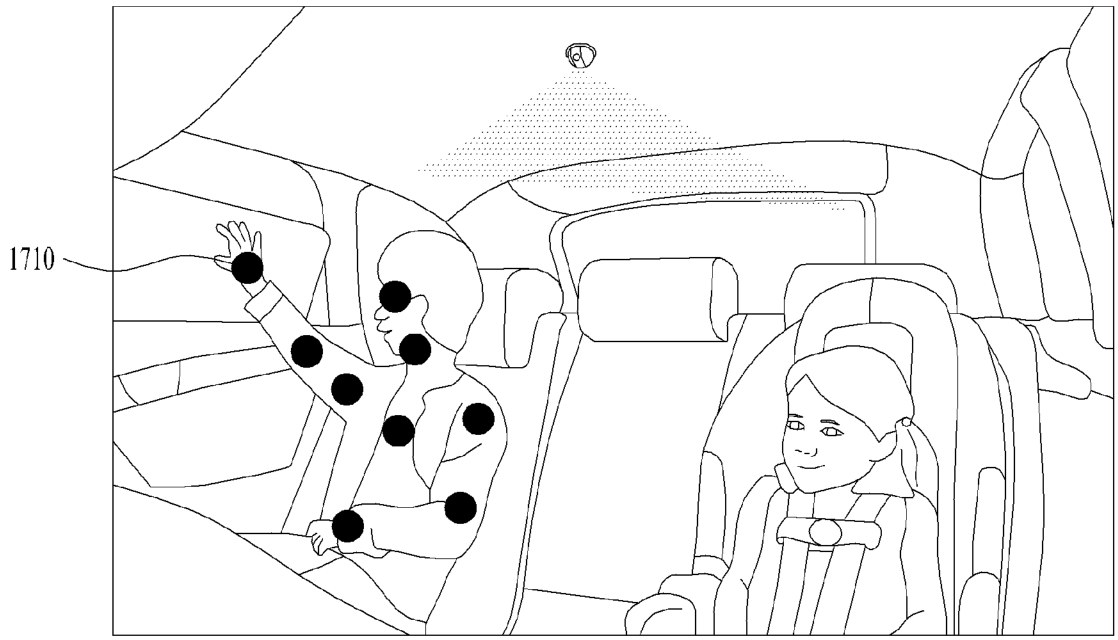
FIG. 17 and FIG. 18 are diagrams to describe an operation of an occupant pose recognizing unit in an occupant monitoring method according to one aspect of the present invention.
Figure 17:
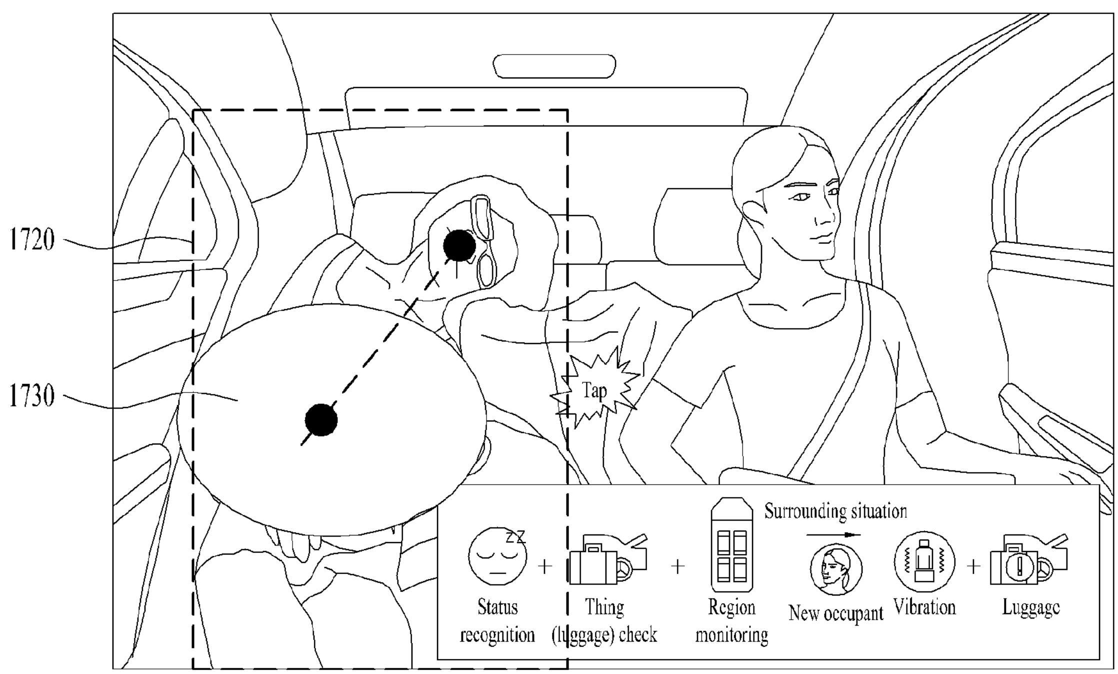
Figure 18:
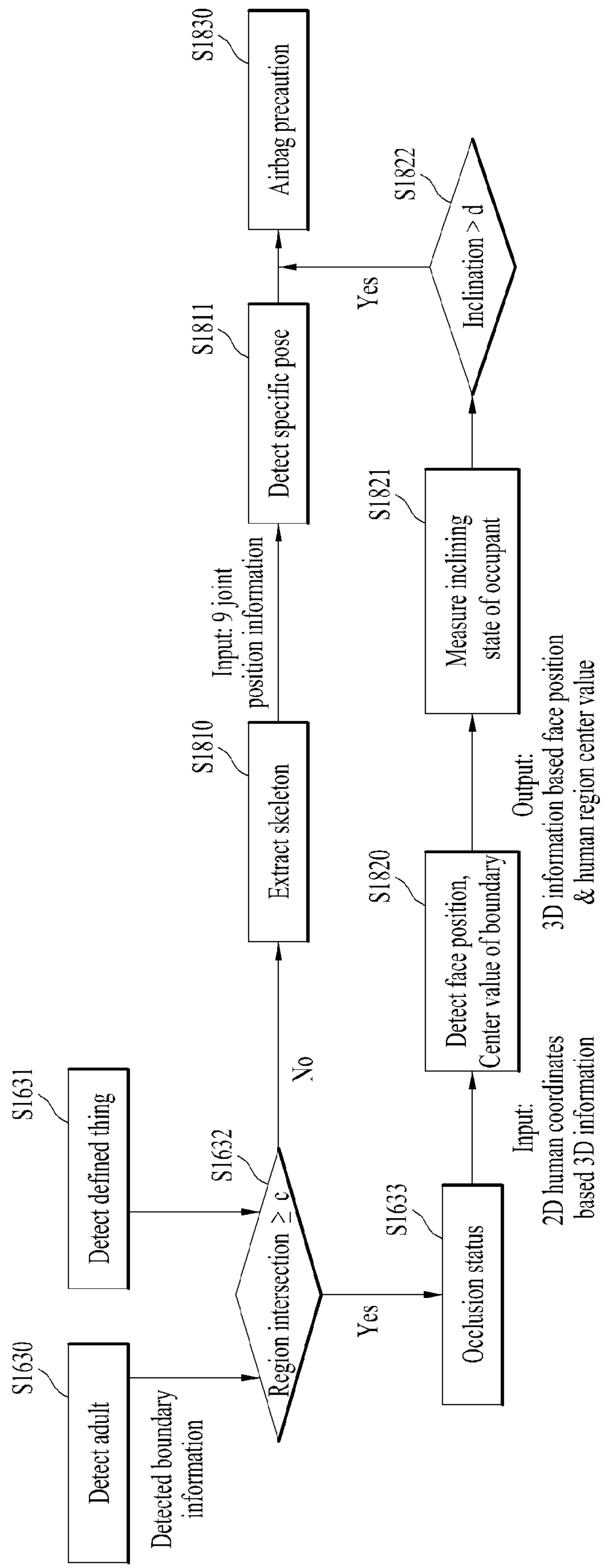

FIG. 17 and FIG. 18 are diagrams to describe an operation of an occupant pose recognizing unit in an occupant monitoring method according to one aspect of the present invention.

FIG. 17 (*a*) is a diagram showing a method of recognizing a pose of an occupant in a status of non-presence of occlusion (or, a status smaller than a preset threshold). FIG. 17 (*b*) is a diagram showing a method of recognizing a pose of an occupant in a status of presence of occlusion (or, a status greater than a preset threshold).

Referring to FIG. 17 (*a*), an occupant pose recognizing unit can recognize an occupant's pose by extracting at least one or more skeleton landmark points 1710. According to one aspect of the present invention, the occupant pose recognizing unit recognizes a pose that an occupant opens an window in a moving vehicle and may then output a warning or activate a window lock.

Meanwhile, in the status of the presence of occlusion, as shown in FIG. 17 (*b*), it is difficult to accurately recognize a pose of an occupant. Hence, using center of mass of an object region in which occlusion occurs, the occupant's pose is estimated.

Particularly, the occupant pose recognizing unit can estimate a pose of an occupant from a slope of a virtual line that connects a face position of the occupant detected from an occupant region 1720 to a position of the center of mass of an object region 1730. If determining that the occupant's pose is not appropriate, the occupant pose recognizing unit outputs a warning, thereby preventing a safety accident that may possibly occur when an airbag is turned on.

FIG. 18 is a flowchart of the scenario described with reference to FIG. 17. Steps S1630 to S1633 shown in FIG. 18 can be understood as equal to the steps S1630 to S1633 shown in FIG. 16.

If a region in which a detected occupant region and a detected thing region overlap each other is smaller than a threshold c, the occupant pose recognizing unit extracts a skeleton of an occupant [S1810] and detects a specific pose [S1811]. The steps S1810 and S1811 can be understood as the scenario of FIG. 17 (*a*). For example, the specific pose may include: (i) a pose inclining to a seat; (ii) an action of stretching an arm while looking at a window; or (iii) an action of bending forward while lowering a head.

Meanwhile, as a region in which a detected occupant region and a detected thing region overlap each other is greater than a threshold c, if an occlusion status is determined [S1663], the occupant pose recognizing unit detects a face position of the occupant from the occupant region and detects a position of a center of mass of the object region [S1820]. Subsequently, the occupant pose recognizing unit measures an inclining state (e.g., inclination) of the occupant [S1821] and compares the inclination with a threshold d [S1822]. Steps S1820 to S1822 can be understood as the scenario of FIG. 17 (*b*).

If the specific pose according to the step S1811 is not appropriate or the inclination according to the step S1822 is greater than the threshold, the occupant pose recognizing unit can output a warning (e.g., airbag precaution) [S1830].

Figure 19:
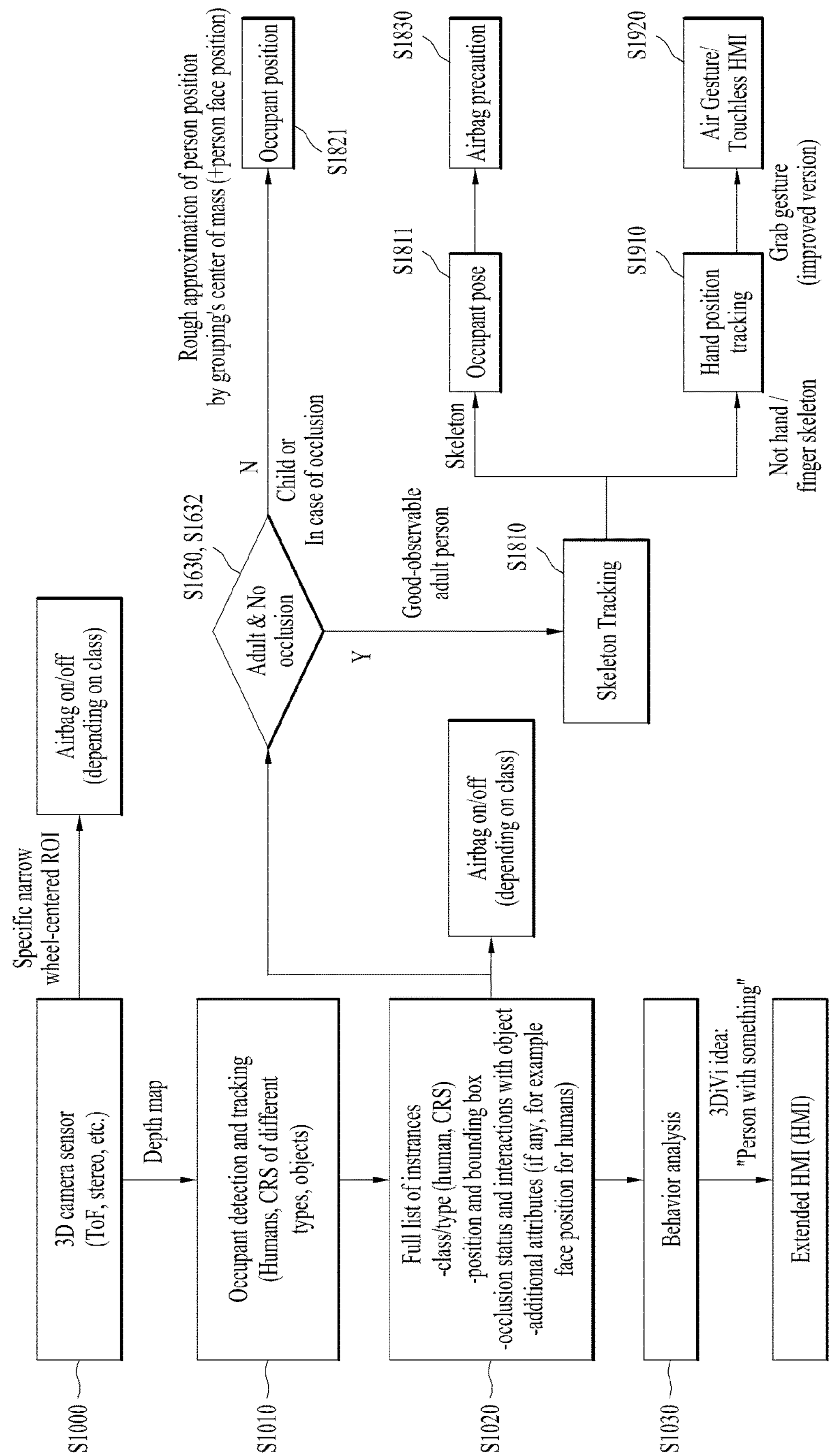
FIG. 19 is a whole flowchart of the occupant monitoring method described in FIG. 18.

FIG. 19 is a whole flowchart of the occupant monitoring method described in FIG. 18. Referring to FIG. 19, the reference numbers of the aforementioned steps are exactly used for the corresponding parts. Hence, the steps described with reference to FIGS. 10 to 18 shall be omitted.

Meanwhile, if skeleton tracking is performed according to the step S1810, the processor 800 can track a hand position of an occupant [S1910] and then detect a gesture of the occupant through a touchless Human Machine Interface (HMI) additionally [S1920].

Meanwhile, an apparatus for occupant monitoring according to one aspect of the present invention may include a camera obtaining an image in a vehicle and a processor processing the image. Moreover, the processor may include a detecting module separating each region in which an object exists from the image, a classifying module classifying the object existing in the each separated region and a recognizing module recognizing a pose of an occupant if the object corresponds to the occupant.

The camera may include one of a 2D based RGB camera, a 2D based IR camera and a 3D based ToF (Time of Flight) camera.

Learning data of an object model is defined in advance based on deep learning, and the detecting module may separate the object existing region using the learning data.

If a first object corresponding to the occupant and a second object corresponding to a thing exist in the separated region, the classifying module may detect a region in which the first and second objects overlap each other.

If the overlapped region is smaller than a preset first threshold, the recognizing module may recognize a pose of the first object using skeleton tracking. If the pose of the first object corresponds to a preset pose, the processor may output a warning or control on/off of an airbag.

If the overlapped region is equal to or greater than the preset first threshold, the recognizing module may detect an inclination of the first object based on a face position of the first object and a position of a center point of the second object. If the inclination is greater than a preset second threshold, the processor may output a warning or control the on/off of the airbag.

The classifying module may extract a context of the first object based on a position of the second object. And, the processor may control at least one of the airbag, a display and/or an audio based on the extracted context.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein. It will be appreciated by those skilled in the art that various modifications and variations can be made in the present specification without departing from the spirit or scope of the inventions. Thus, it is intended that the present specification covers the modifications and variations of this invention provided they come within the scope of the appended claims and their equivalents.

Both apparatus and method inventions are mentioned in this specification and descriptions of both of the apparatus and method inventions may be complementarily applicable to each other.

MODE FOR INVENTION

Various forms for the embodiment of the invention are described in the best mode of the invention.

The above describe should not be restrictively interpreted in all aspects but considered exemplarily. Various modifications and variations can be made in the present invention without departing from the spirit or scope of the inventions, and the present invention covers the modifications and variations of this invention provided they come within the scope of the appended claims and their equivalents.

INDUSTRIAL APPLICABILITY

The present invention mentioned in the foregoing description can be implemented in a program recorded medium as computer-readable codes. The computer-readable media may include all kinds of recording devices in which data readable by a computer system are stored. The computer-readable media may include HDD (Hard Disk Drive), SSD (Solid State Disk), SDD (Silicon Disk Drive), ROM, RAM, CD-ROM, magnetic tapes, floppy discs, optical data storage devices, and the like for example and also include carrier-wave type implementations (e.g., transmission via Internet). Further, the computer may include the controller 180 of the terminal. The foregoing embodiments are merely exemplary and are not to be considered as limiting the present disclosure. The present teachings can be readily applied to other types of methods and apparatuses. Thus, it is intended that the present invention covers the modifications and variations of this invention that come within the scope of the appended claims and their equivalents.

What is claimed is:

1. An apparatus for monitoring an occupant, the apparatus comprising:

a camera configured to obtain an image in a vehicle; and a processor configured to:

process the image, separate each region in which an object exists from the image using predefined learning data of an object model, wherein the predefined learning data is based on deep learning, classify the object existing in the each separated region, recognize a pose of the occupant based on a first object corresponding to the occupant, based on an overlapped region for the first object and a second object being equal to or larger than a preset first threshold, detect an inclination of the first object based on a facial position of the first object and a position of a center point of the second object, and cause an output of a warning based on the inclination being greater than a preset second threshold.

2. The apparatus of claim 1, wherein the predefined learning data is defined based on vehicle 3D information of the vehicle and object 3D rendering information inputted from a user.

3. The apparatus of claim 1, wherein the processor is further configured to:

match the predefined learning data with the obtained image in the vehicle, separate a seat region of the vehicle based on the matching, and separate the object existing in the each separated region from the separated seat region.

4. The apparatus of claim 1, wherein based on an object being a Chair Restriction Seat (CRS), the processor is further configured to detect an installed state of the CRS through image processing and to detect a volume of an occupant in the CRS.

5. The apparatus of claim 4, wherein based on the CRS being installed in a rear direction of the vehicle and the detected volume of the occupant being in a preset range, the processor is further configured to control an airbag to be turned off.

6. The apparatus of claim 1, wherein based on the first object corresponding to the occupant, the second object corresponding to a thing, and the first object and the second object existing in the each separated region, the processor is further configured to detect a region in which the first and second objects overlap each other.

7. The apparatus of claim 6, wherein based on the overlapped region being smaller than the preset first threshold, the processor is further configured to recognize a pose of the first object using skeleton tracking and wherein based on the pose of the first object corresponding to a preset pose, the processor is further configured to cause an output of a warning or to control an on/off state of an airbag.

8. The apparatus of claim 1, wherein based on the inclination being greater than the preset second threshold, the processor is further configured to control an on/off state of an airbag.

9. The apparatus of claim 8, wherein the processor is further configured to extract a context of the first object based on a position of the second object.

10. The apparatus of claim 9, wherein the processor is further configured to control at least one of an on/off state of an airbag, a display, or audio based on the extracted context.

11. A method of monitoring an occupant, the method comprising:

obtaining an image in a vehicle through a camera;

separating each region in which an object exists from the image;

separating each region in which an object exists from the image using predefined learning data is based on deep learning;

classifying the object existing in the each separated region;

recognizing a pose of the occupant based on a first object corresponding to the occupant; based on an overlapped region for the first object and a second object being equal to or larger than a preset first threshold, detecting an inclination of the first object based on a facial position of the first object and a position of a center point of the second object, and outputting a warning based on the inclination being greater than a preset second threshold.

* * * * *